US010546450B2

(12) United States Patent
Ito et al.

(10) Patent No.: US 10,546,450 B2
(45) Date of Patent: Jan. 28, 2020

(54) VIDEO SLOT MACHINE, SERVER SYSTEM, AND COMPUTER SYSTEM

(71) Applicant: BANDAI NAMCO ENTERTAINMENT INC., Tokyo (JP)

(72) Inventors: Shogo Ito, Yokohama (JP); Satoshi Tagiri, Yokohama (JP); Akira Tsurumachi, Ota-ku (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 135 days.

(21) Appl. No.: 15/837,634

(22) Filed: Dec. 11, 2017

(65) Prior Publication Data

US 2018/0165913 A1 Jun. 14, 2018

(30) Foreign Application Priority Data

Dec. 12, 2016 (JP) ................................ 2016-240070

(51) Int. Cl.
*G06F 17/00* (2019.01)
*G07F 17/32* (2006.01)
*G07F 17/34* (2006.01)

(52) U.S. Cl.
CPC .......... *G07F 17/3213* (2013.01); *G07F 17/32* (2013.01); *G07F 17/326* (2013.01); *G07F 17/3209* (2013.01); *G07F 17/3244* (2013.01); *G07F 17/34* (2013.01)

(58) Field of Classification Search
None
See application file for complete search history.

(56) References Cited

U.S. PATENT DOCUMENTS

2008/0058080 A1 3/2008 Yoshizawa
2013/0035151 A1* 2/2013 Owen ................ G07F 17/3244 463/20
2014/0031101 A1* 1/2014 Jaffe .................. G07F 17/3267 463/20
2015/0379807 A1* 12/2015 Zhang ..................... G07F 17/34 463/20

FOREIGN PATENT DOCUMENTS

JP 2008-36163 A 2/2008
JP 2015-66396 A 4/2015

* cited by examiner

*Primary Examiner* — Paul A D'Agostino
(74) *Attorney, Agent, or Firm* — Oliff PLC

(57) ABSTRACT

A video slot machine starts spinning display of video reels upon detecting a spin operation, and performs a lottery to determine a special position in symbol stop positions in a reel display area. A character appears behind the video reel in such a manner that a displayed range of the character includes the symbol stop position determined to be the special position. When the video reels stop with a chance symbol stopped in front of the character, a replacement target is selected from the change symbol and other symbols in its periphery in accordance with a section of the character stopped by the chance symbol. Then, outcome of the reels is determined with the replacement target symbols replaced with a reward symbol, and payout is performed.

21 Claims, 30 Drawing Sheets

【FIG.1】
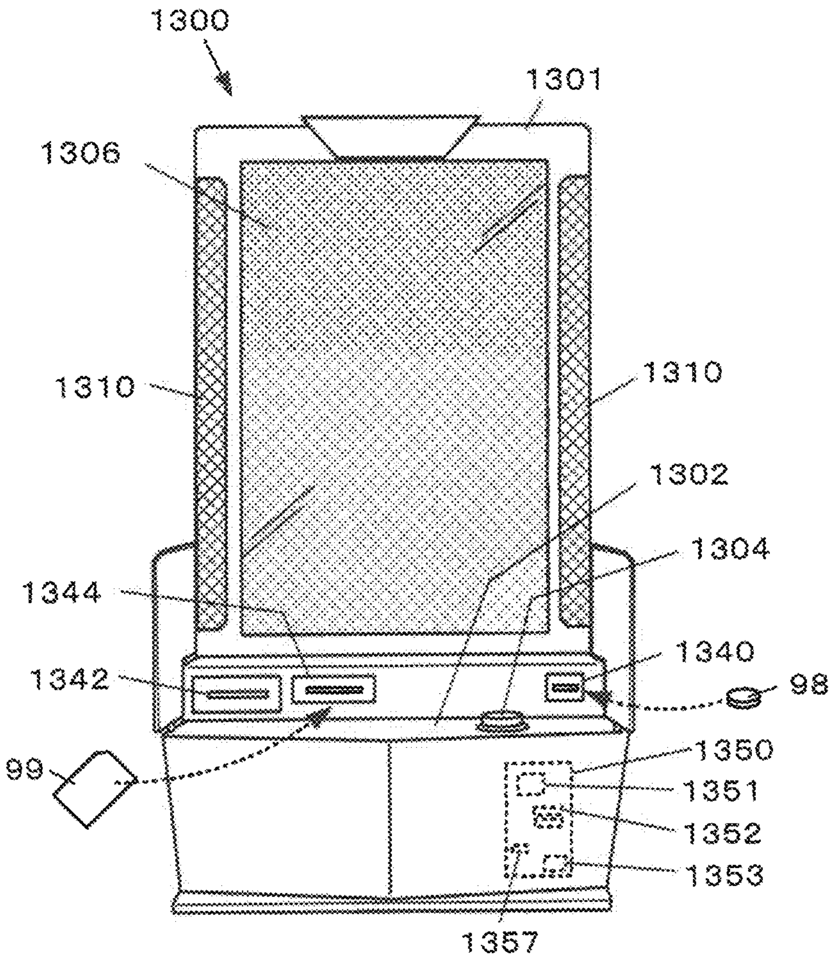

【FIG.2】
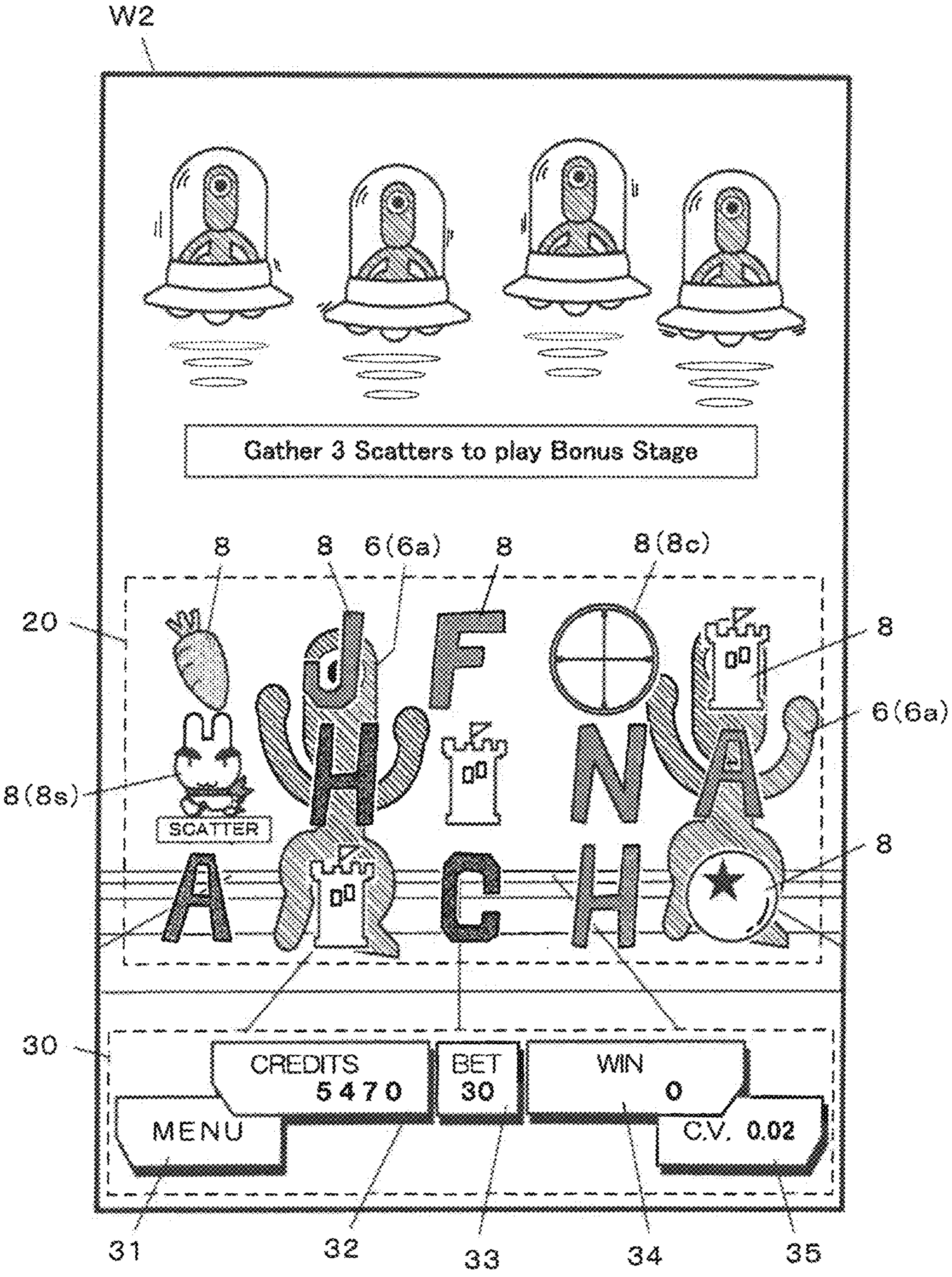

【FIG.3】
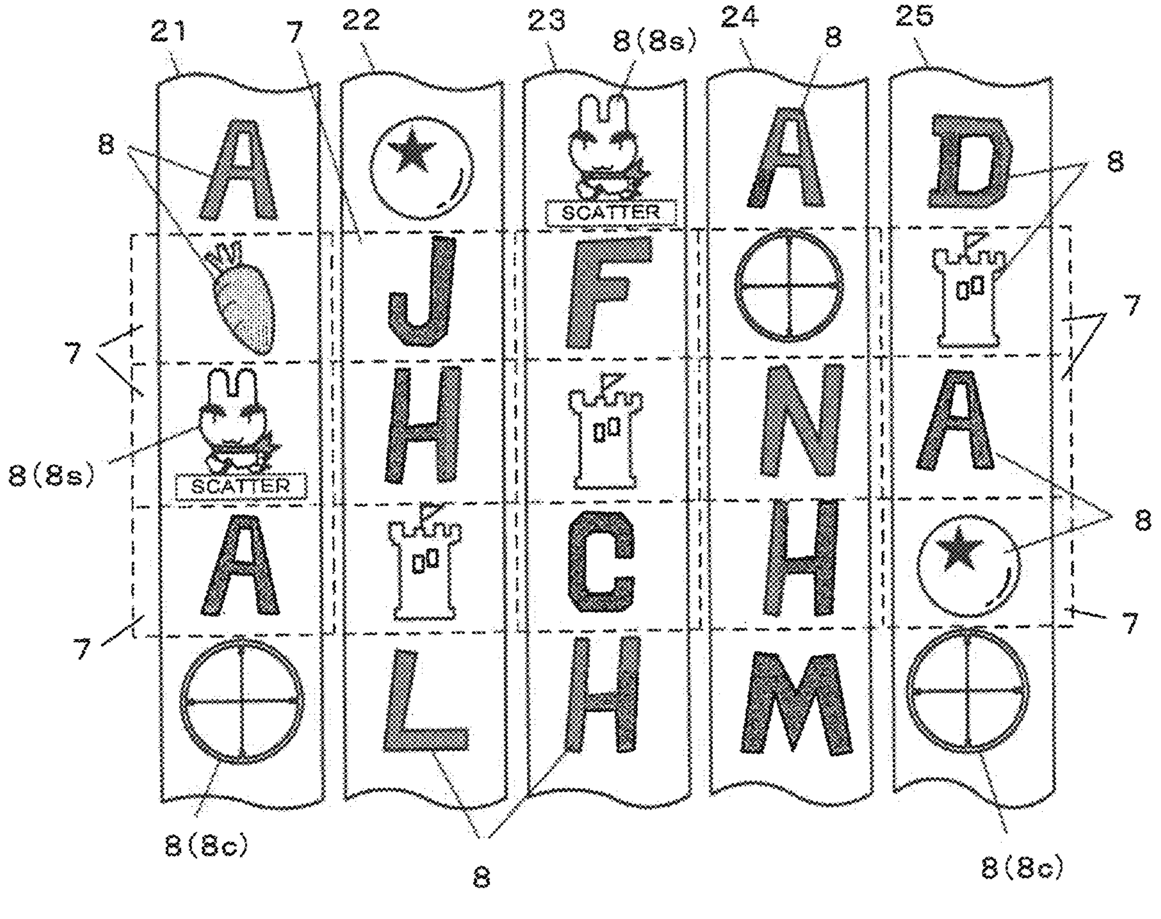

【FIG.4】
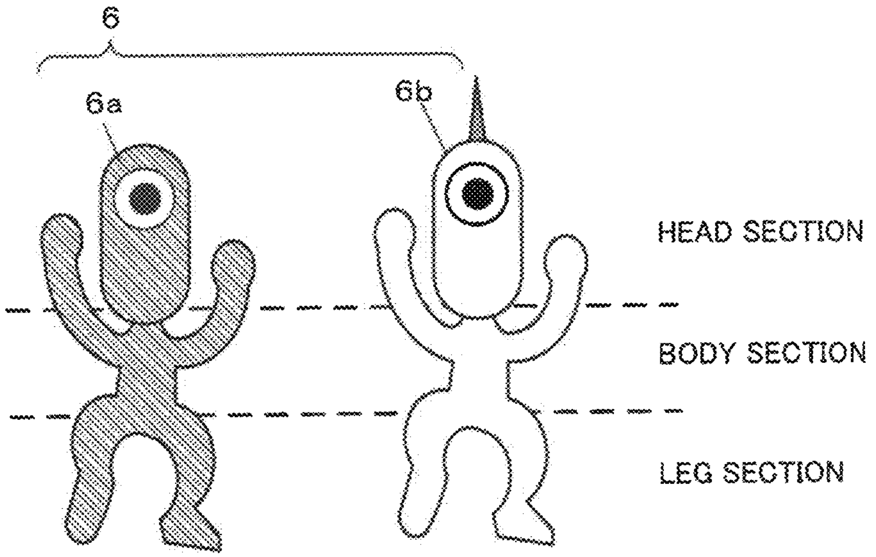

【FIG.5】
(1)
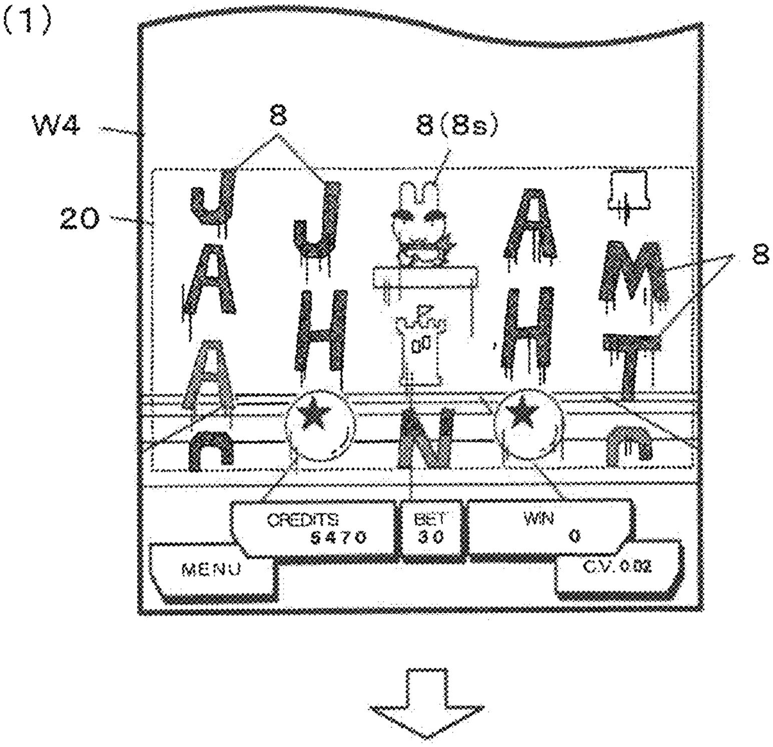
(2)
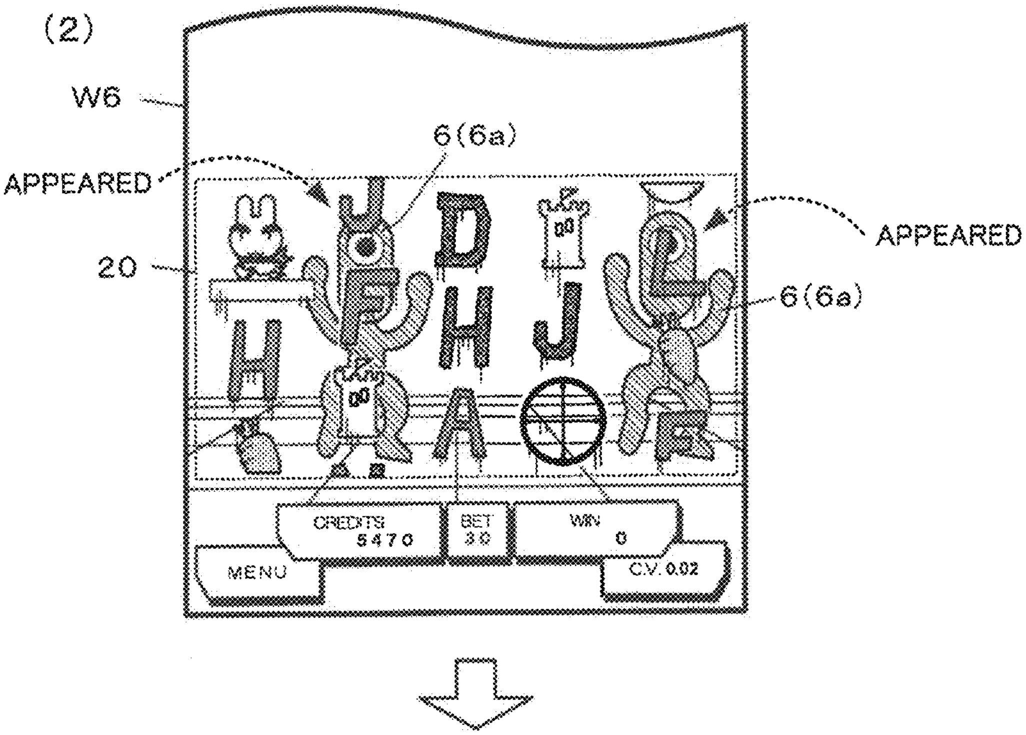
[TO FIG. 6]

【FIG.6】
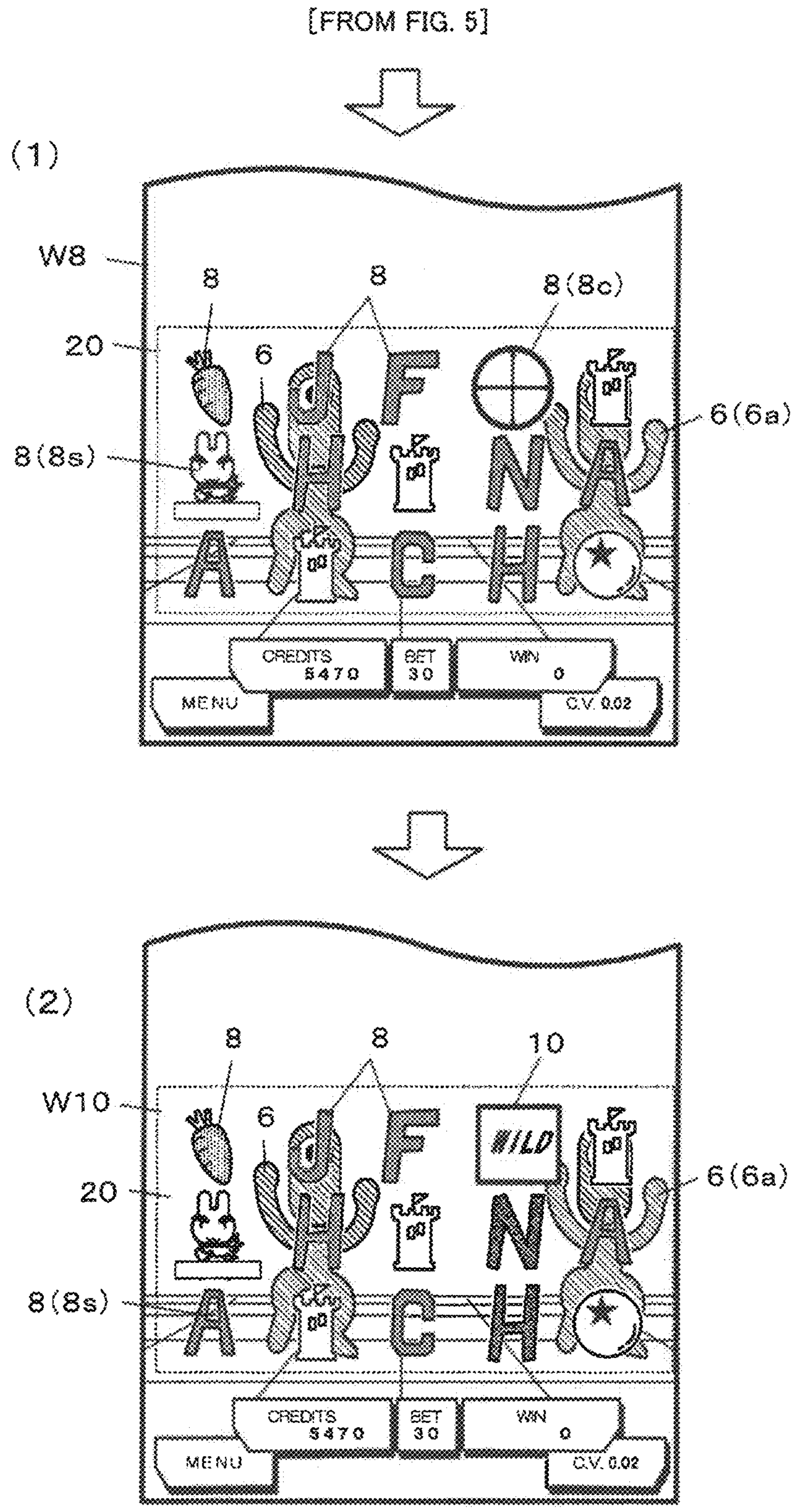

【FIG.7】
(1)
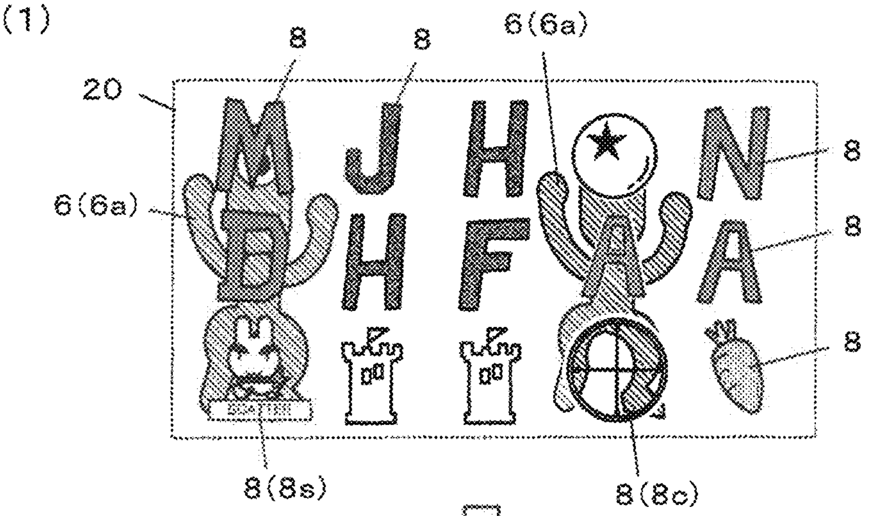
(2)
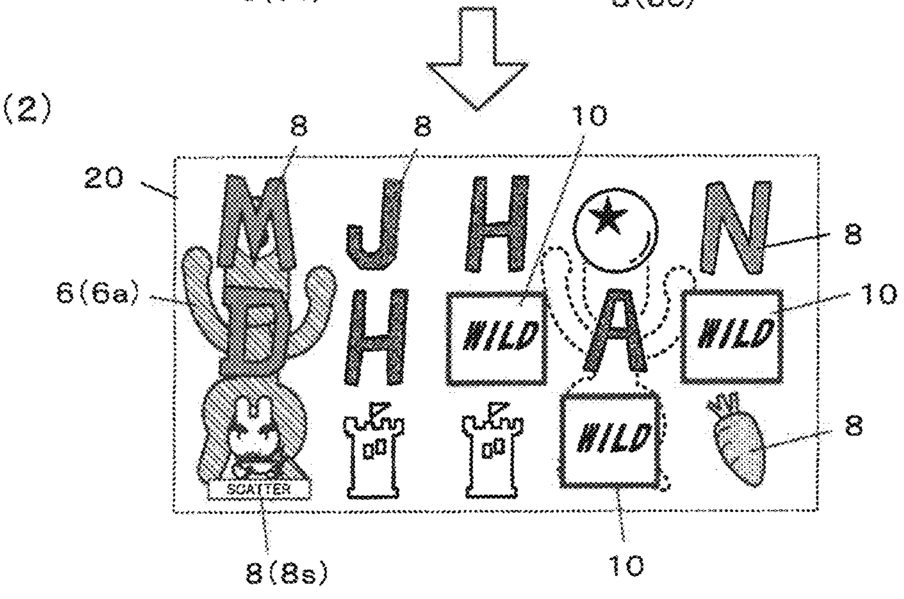

【FIG.8】
(1)
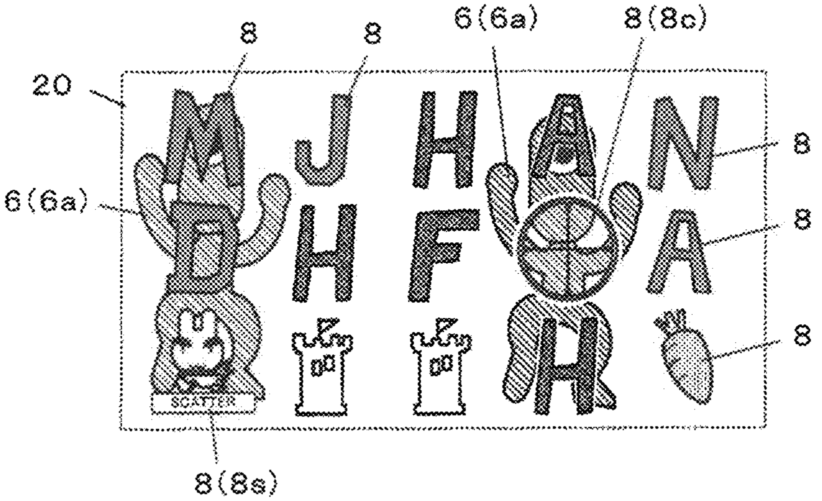
(2)
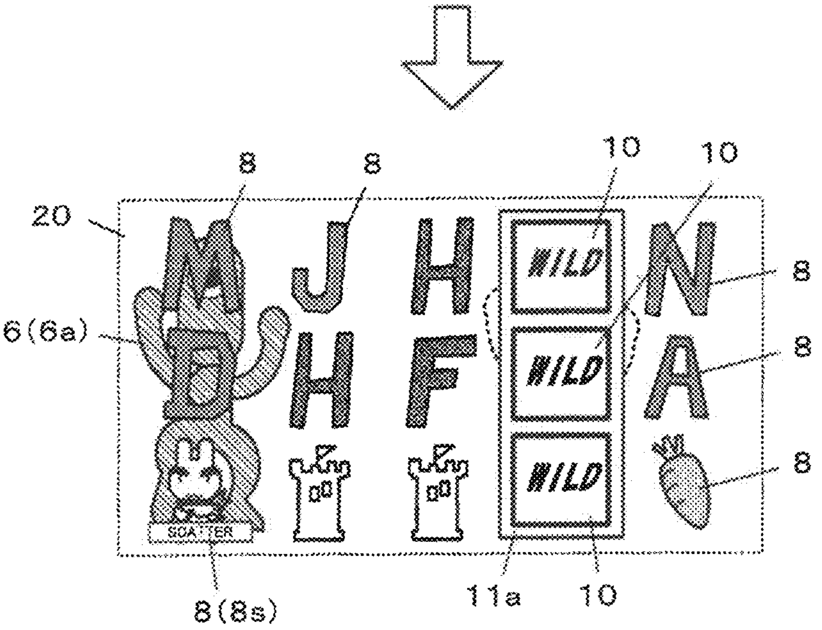
LARGE REWARD SYMBOL

【FIG.9】
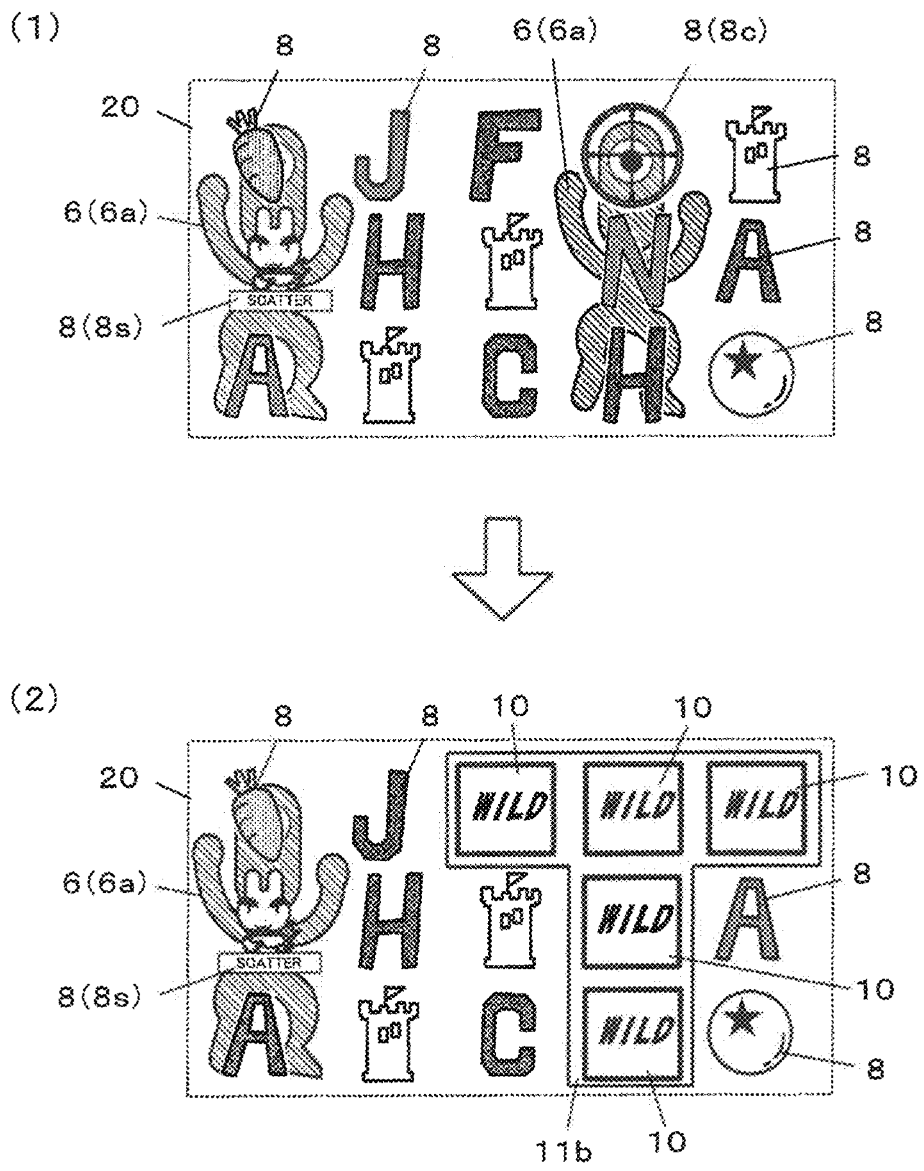

【FIG.10】
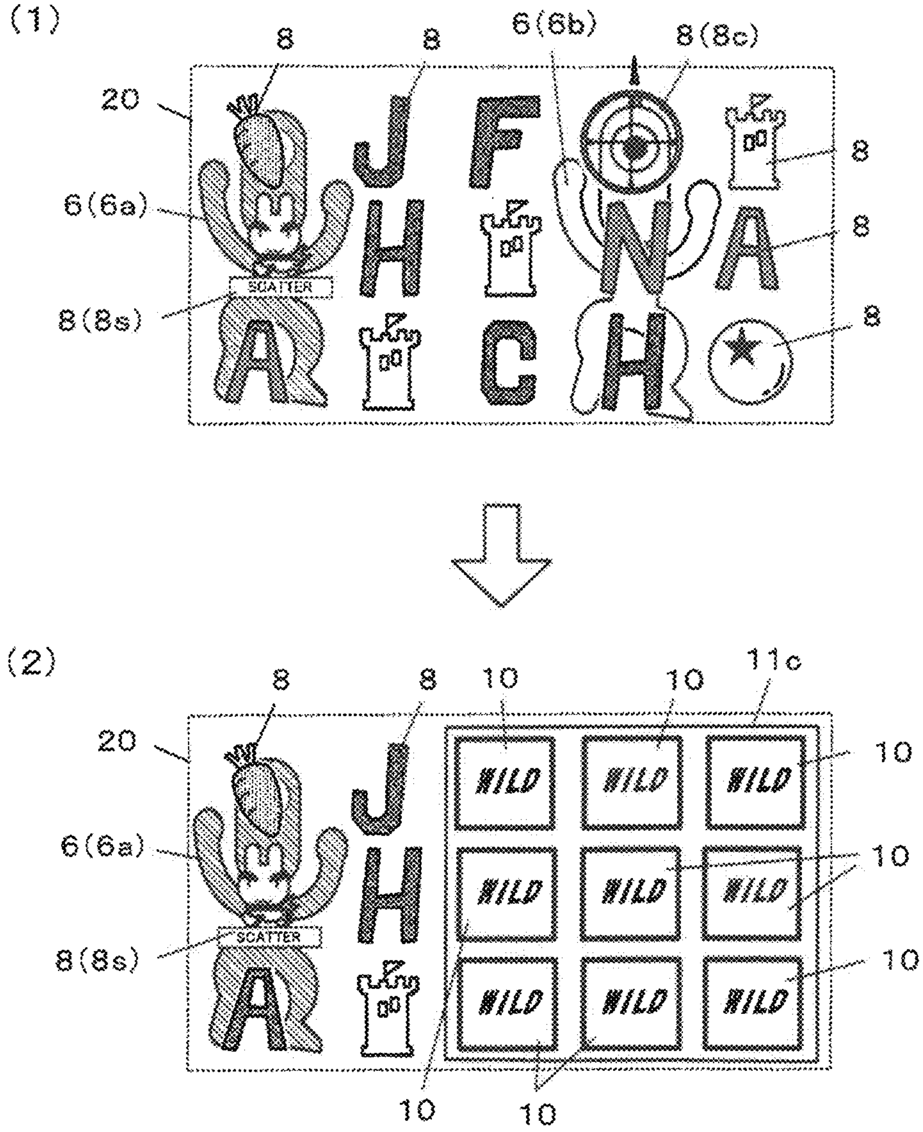

【FIG.11】
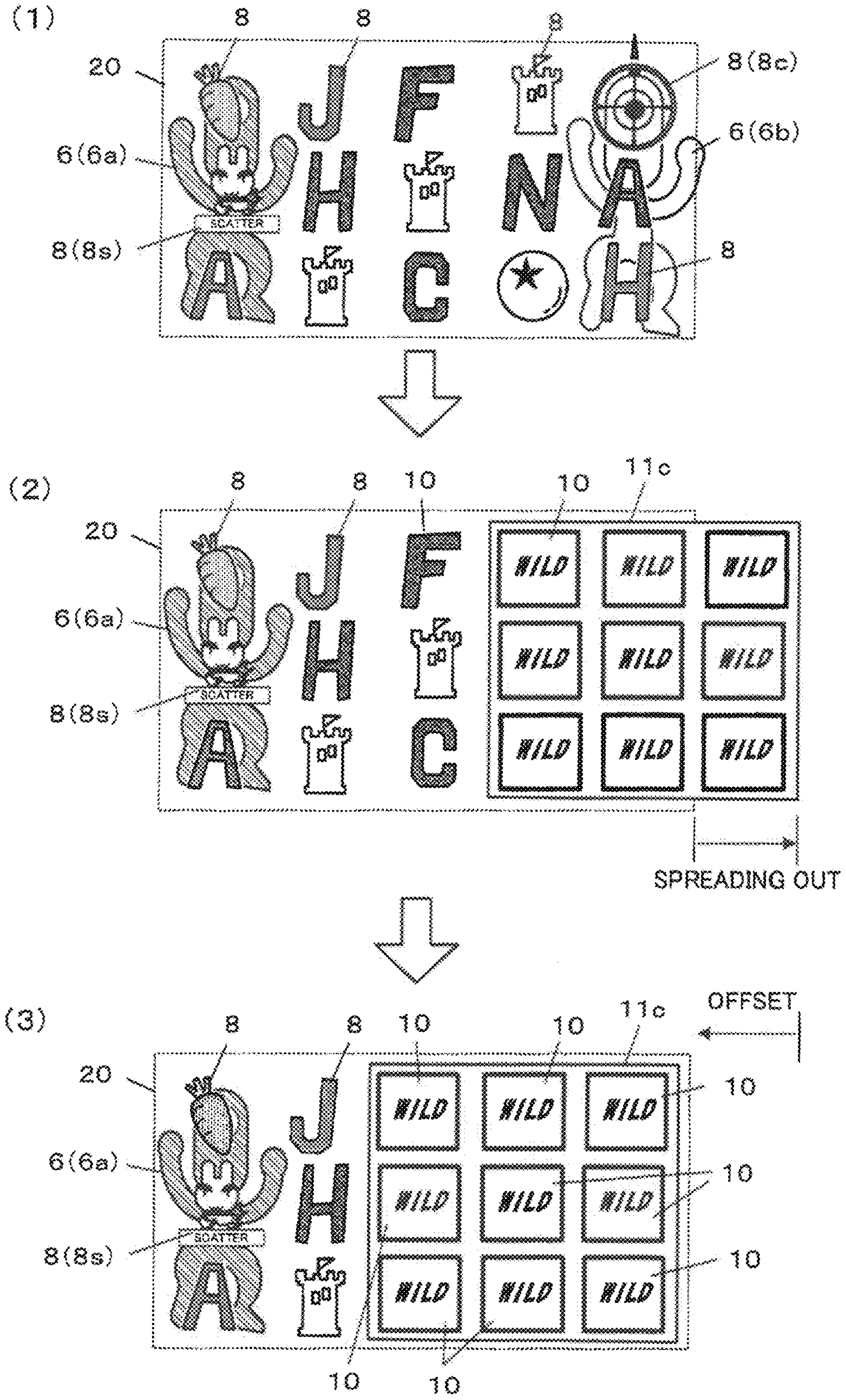

【FIG.12】
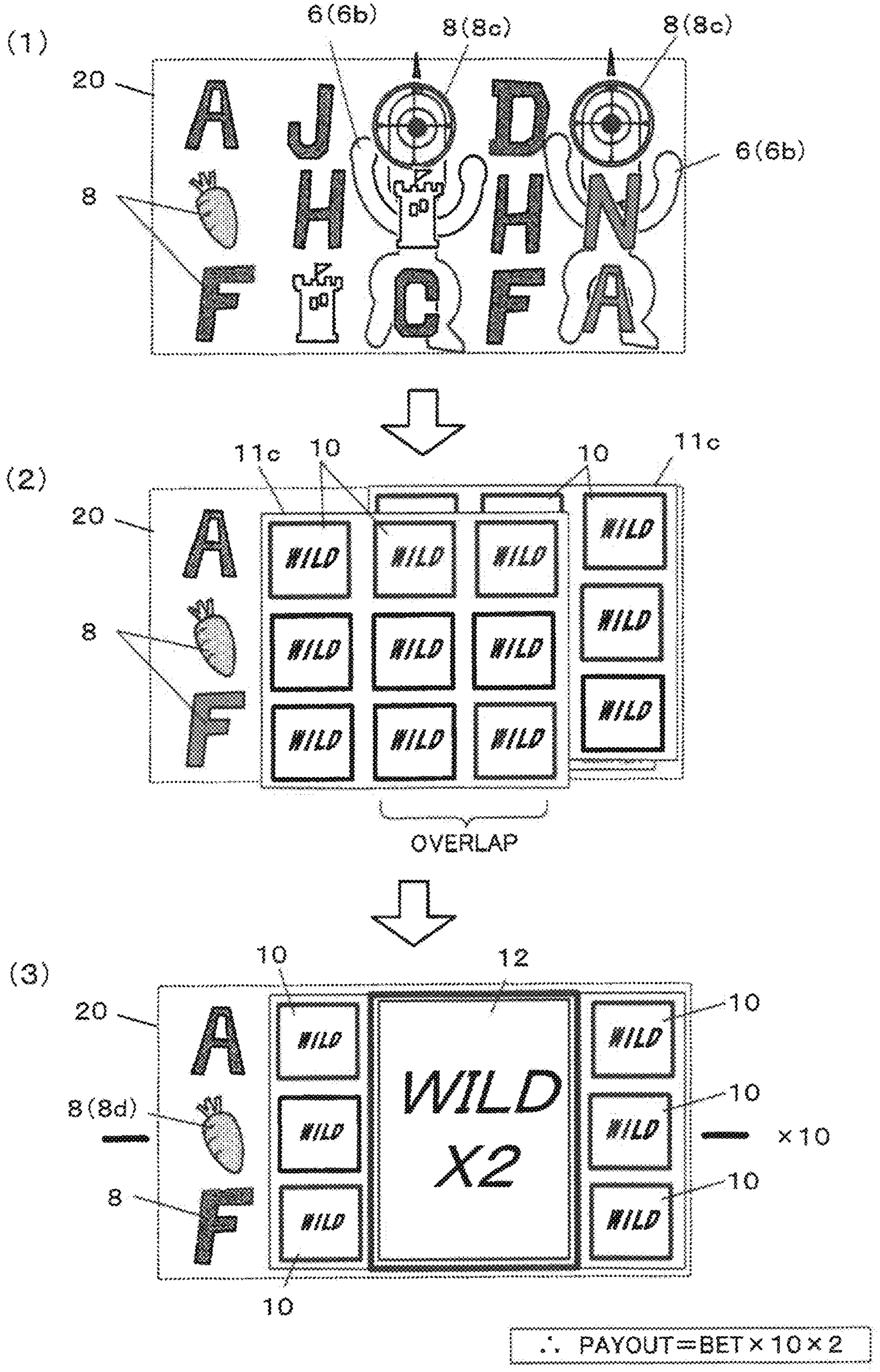

【FIG.13】
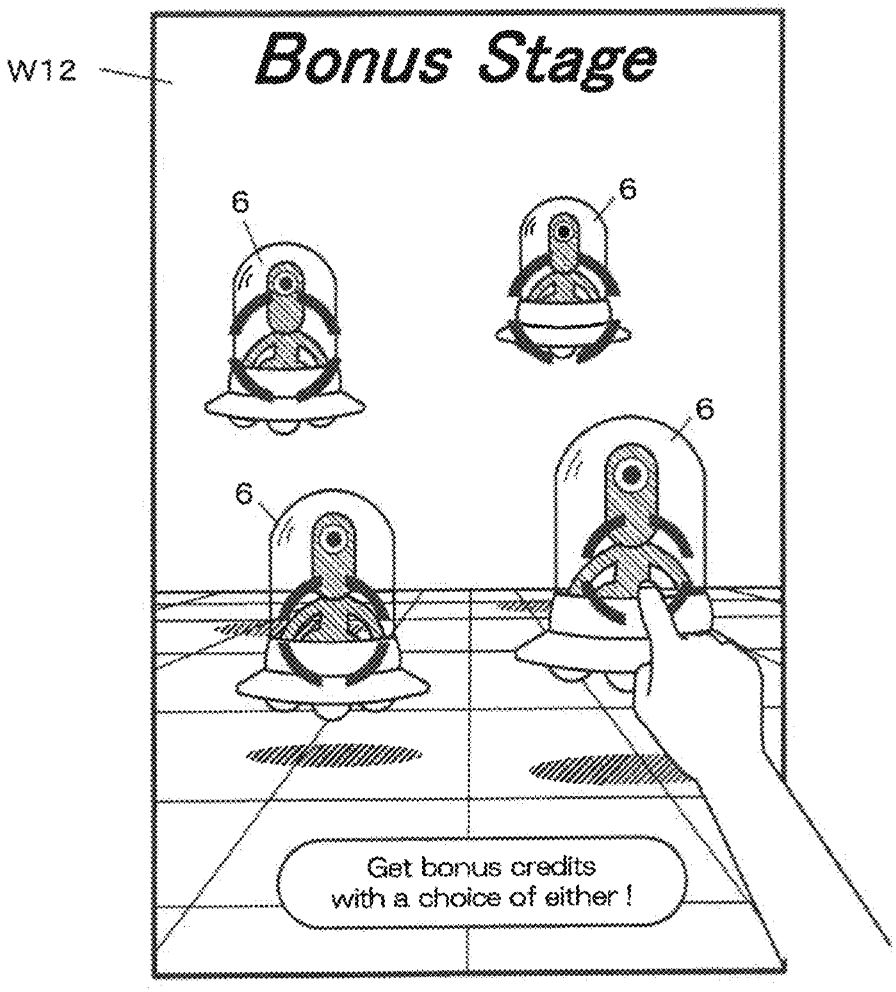

【FIG.14】
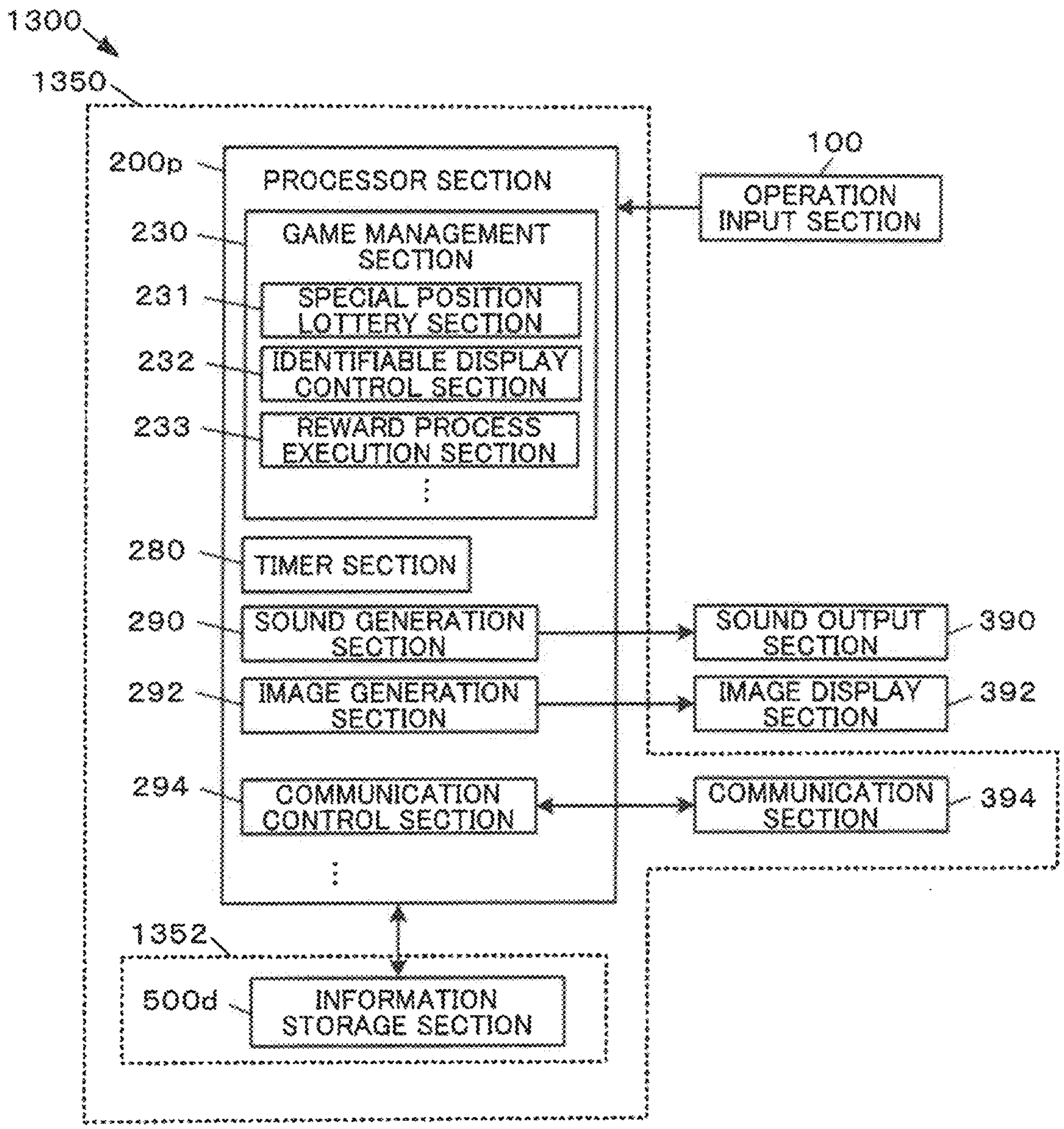

【FIG.15】
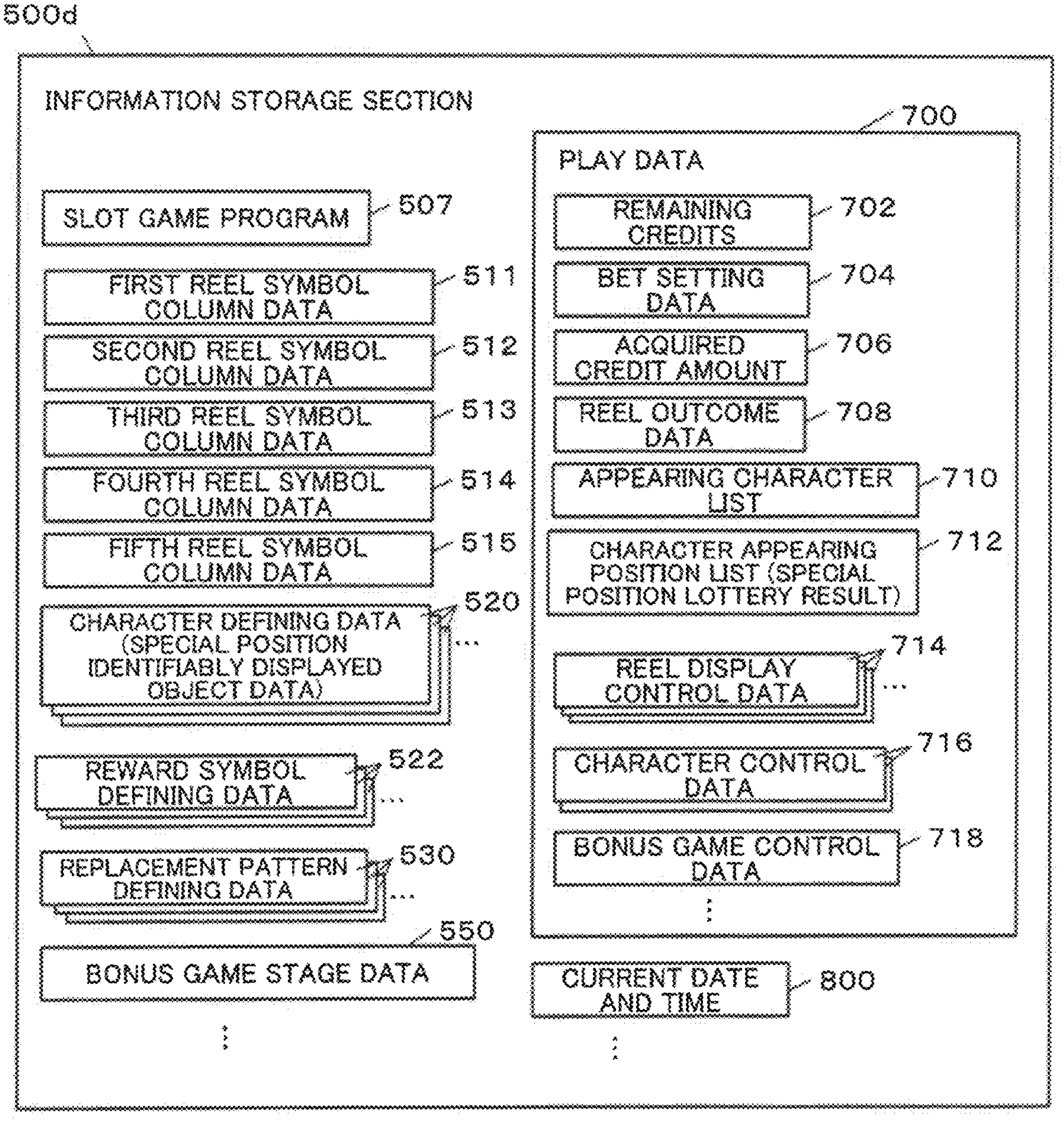

【FIG.16】
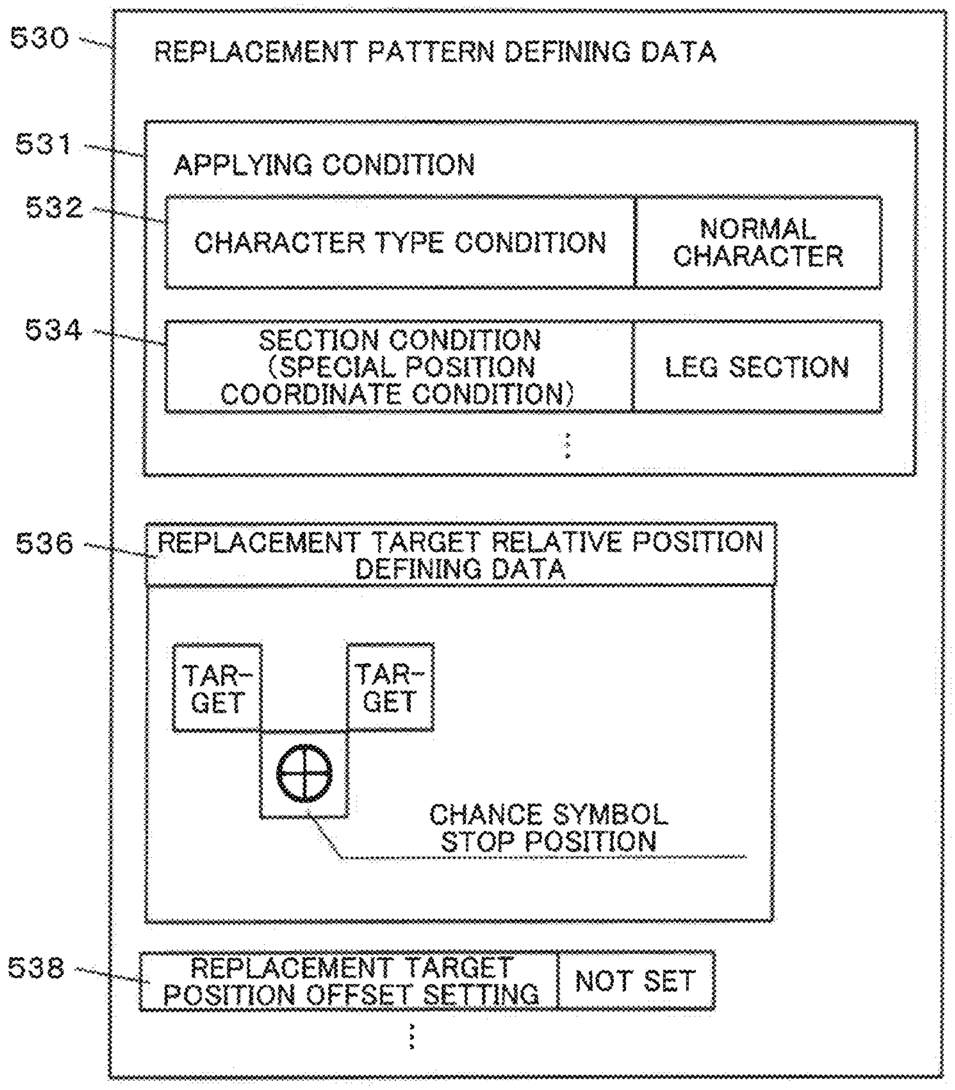

【FIG.17】
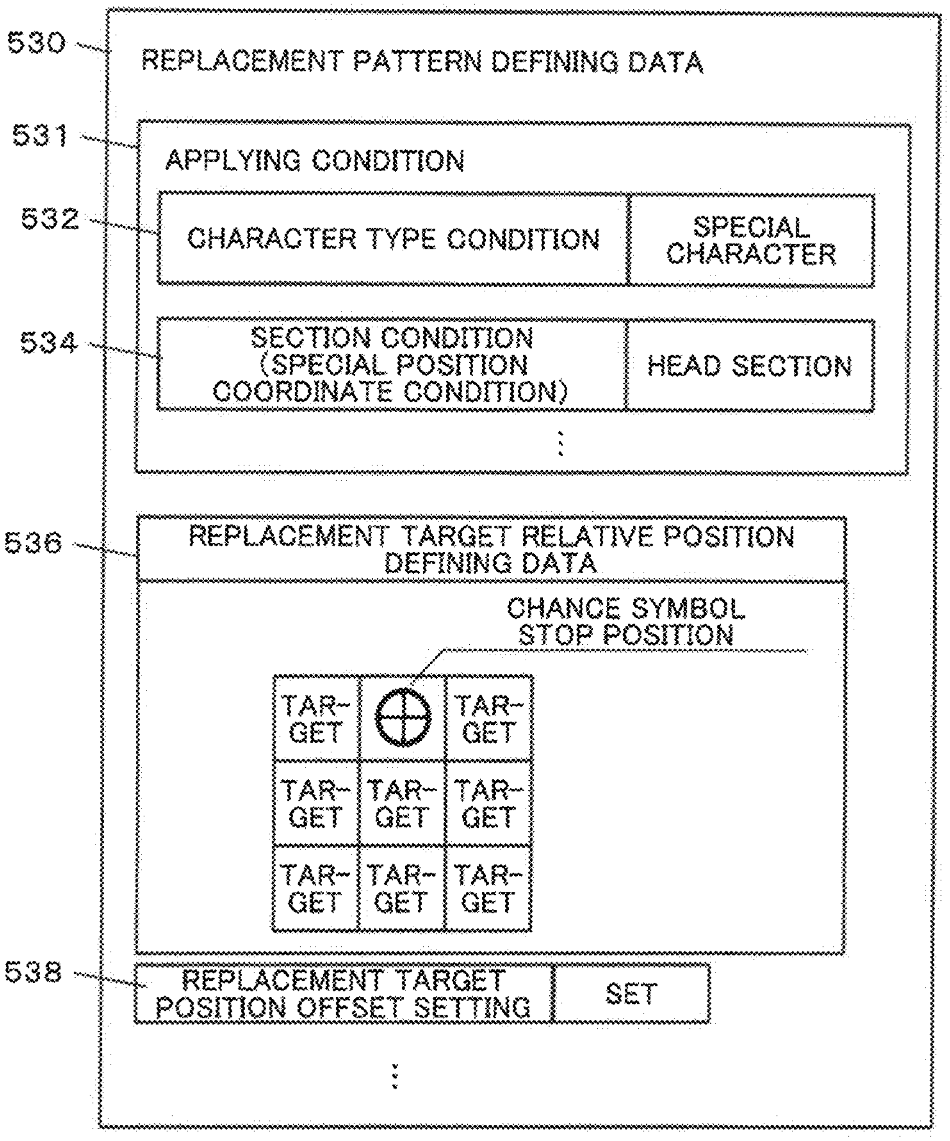

【FIG.18】
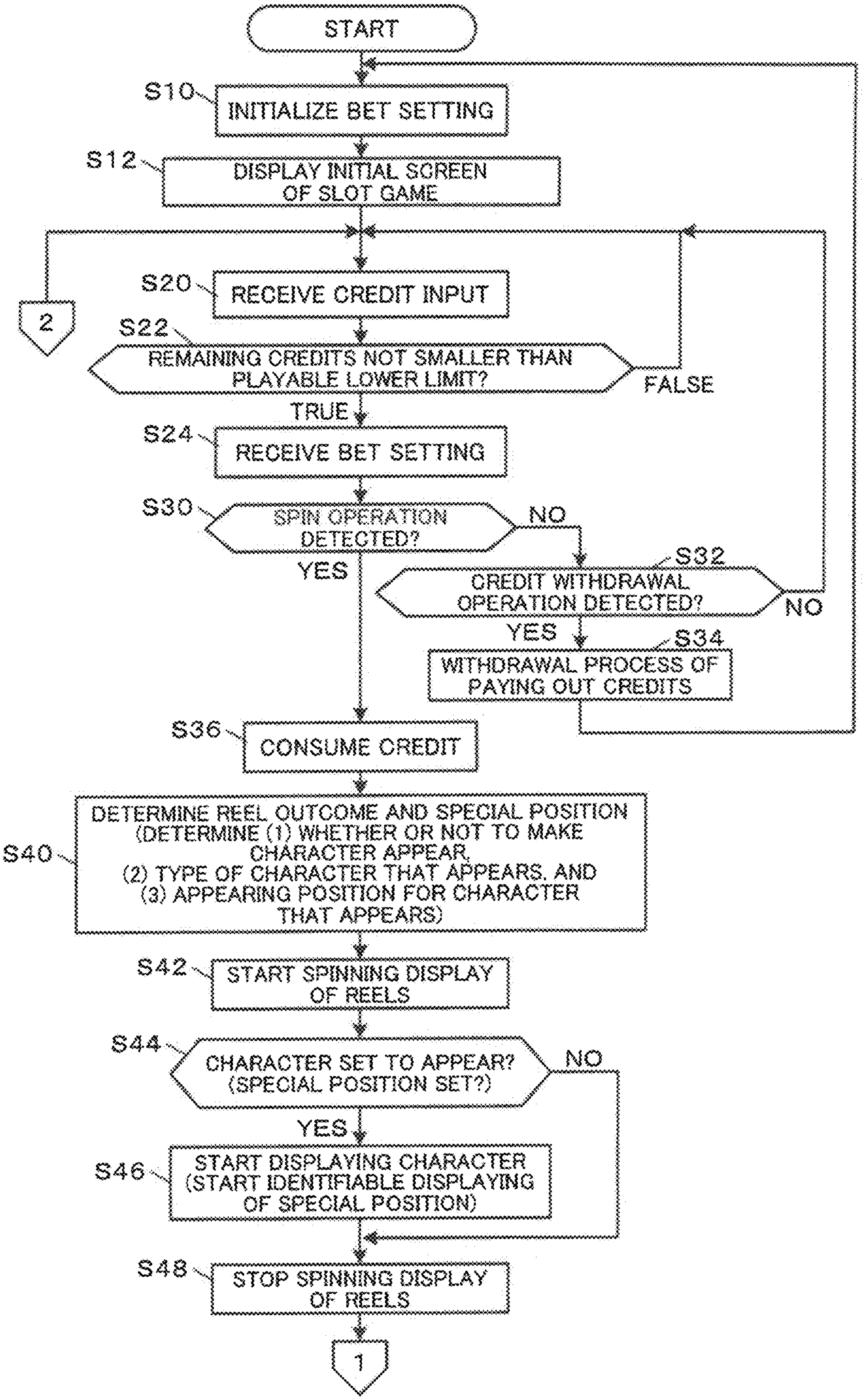

【FIG.19】
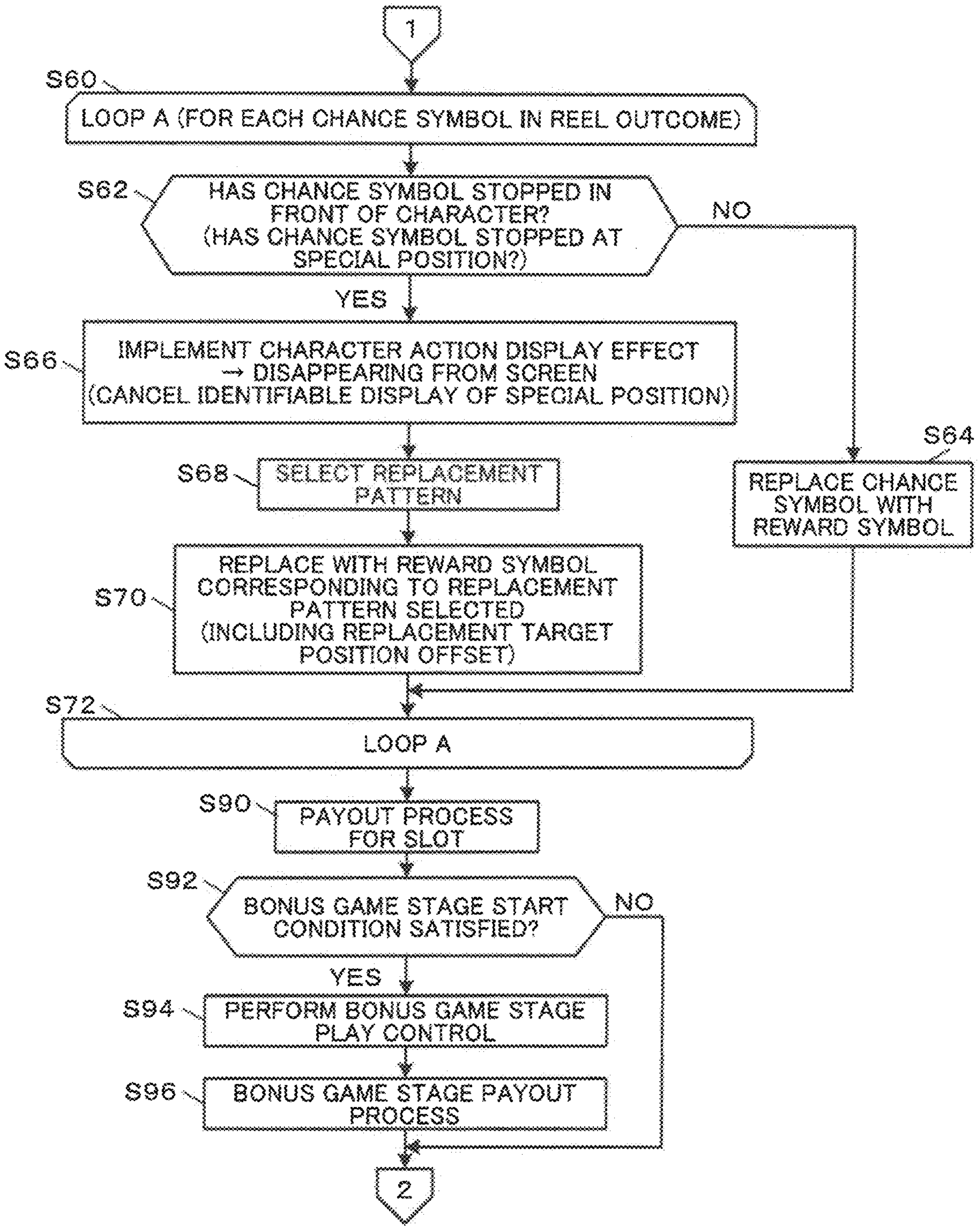

【FIG.20】
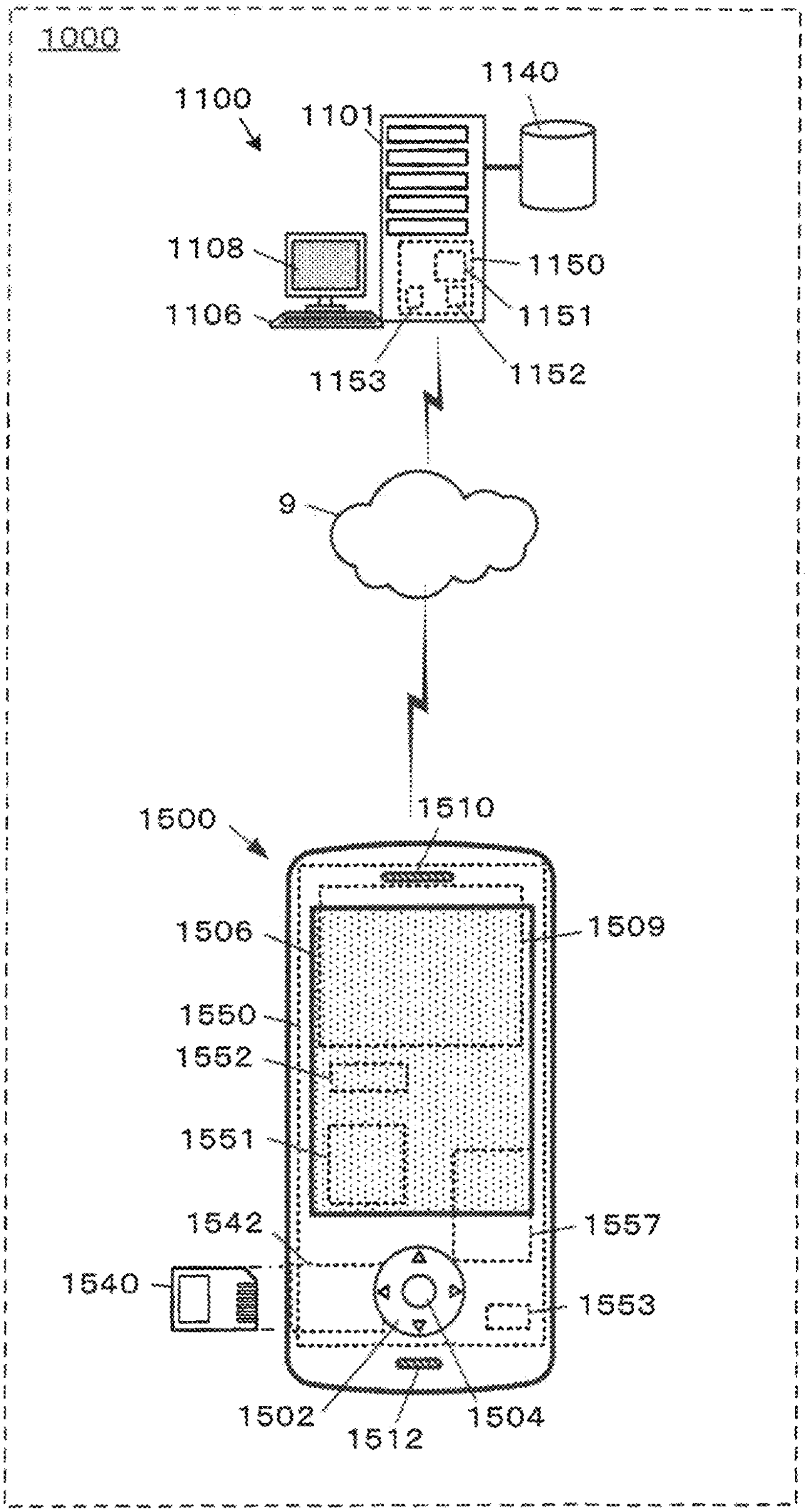

【FIG.21】
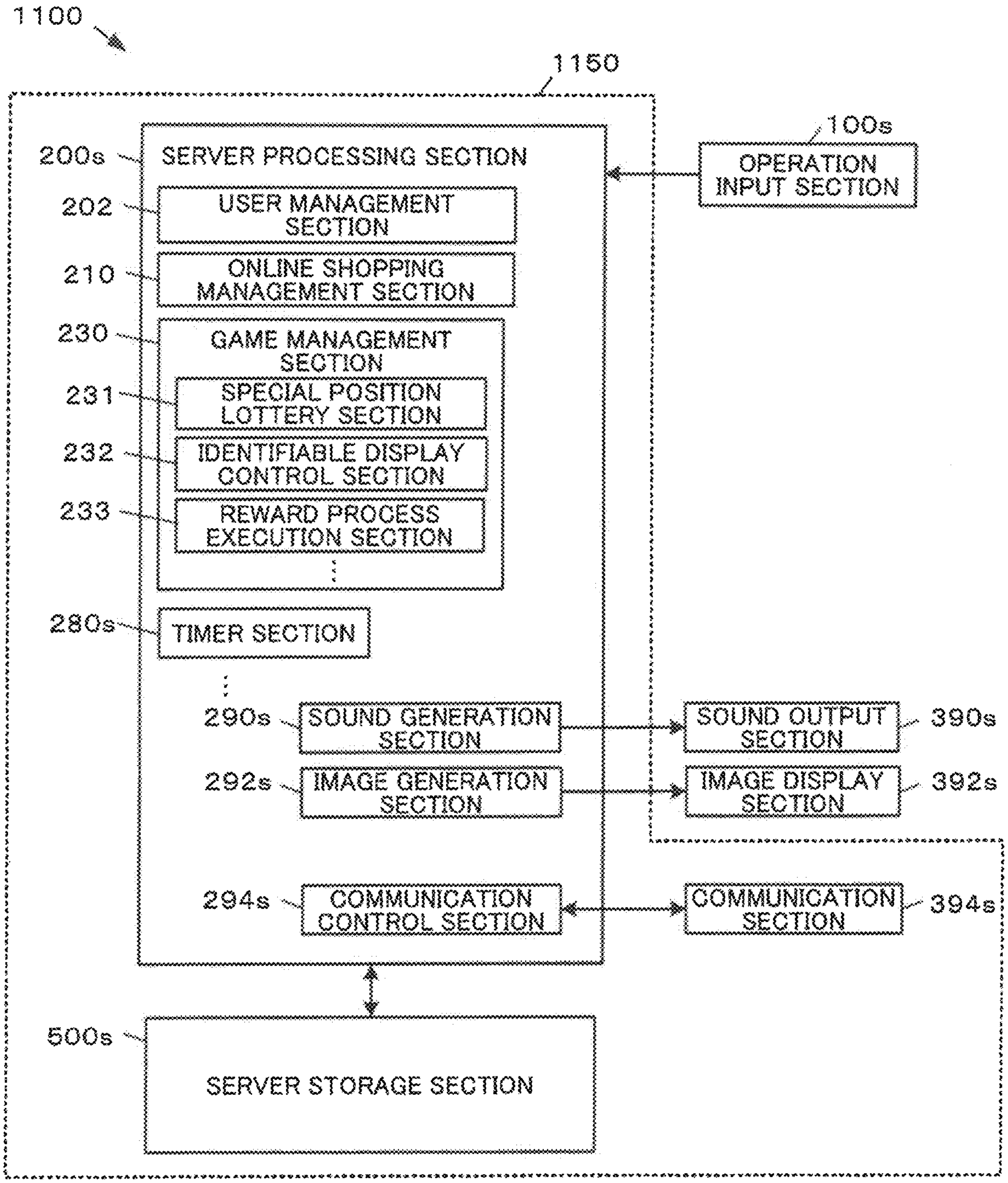

【FIG.22】
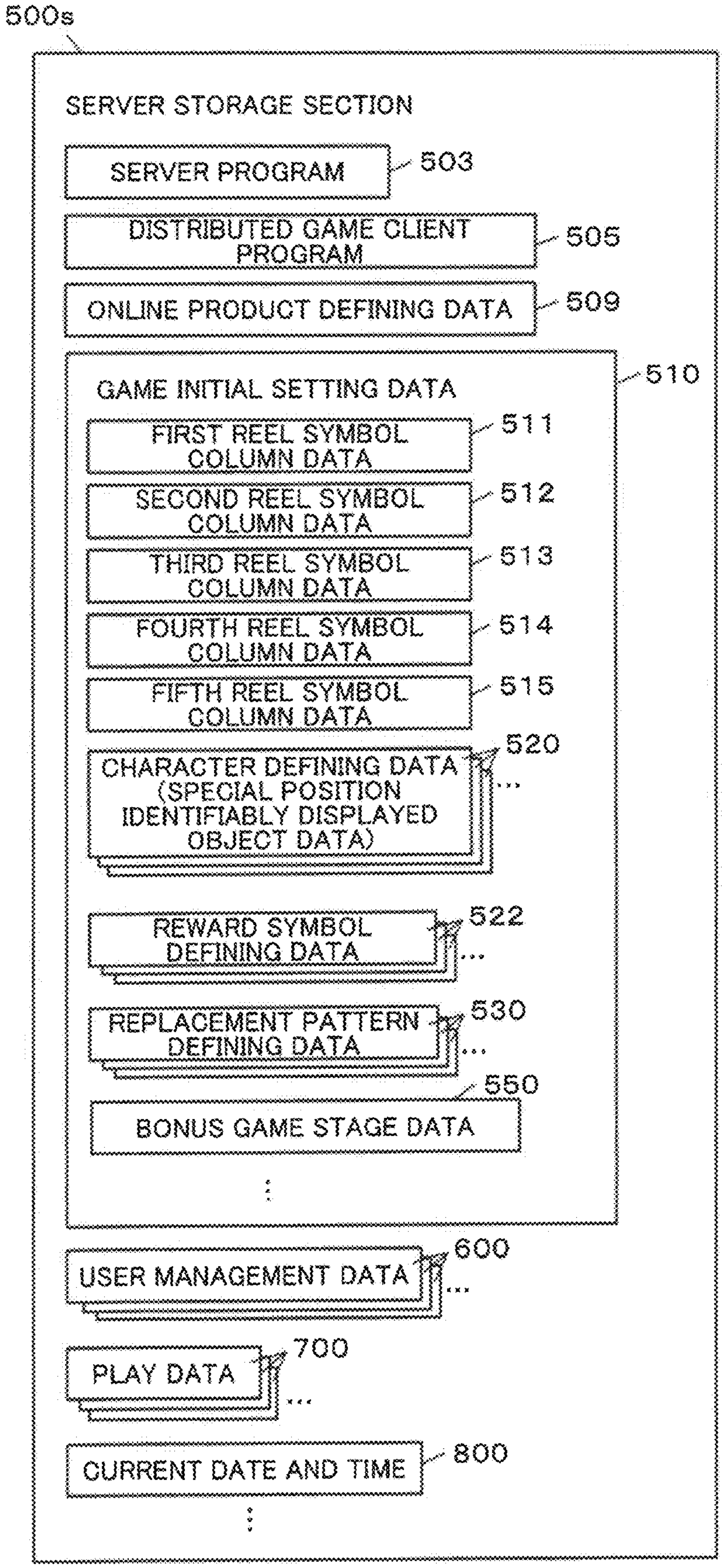

【FIG.23】
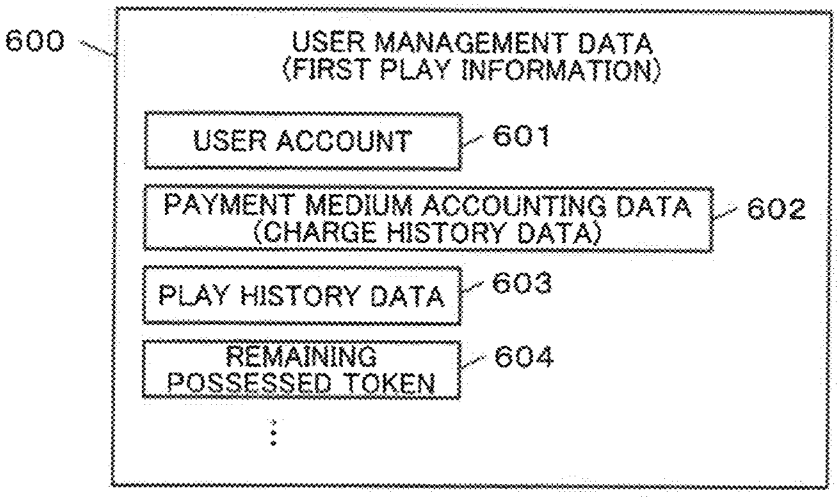

【FIG.24】
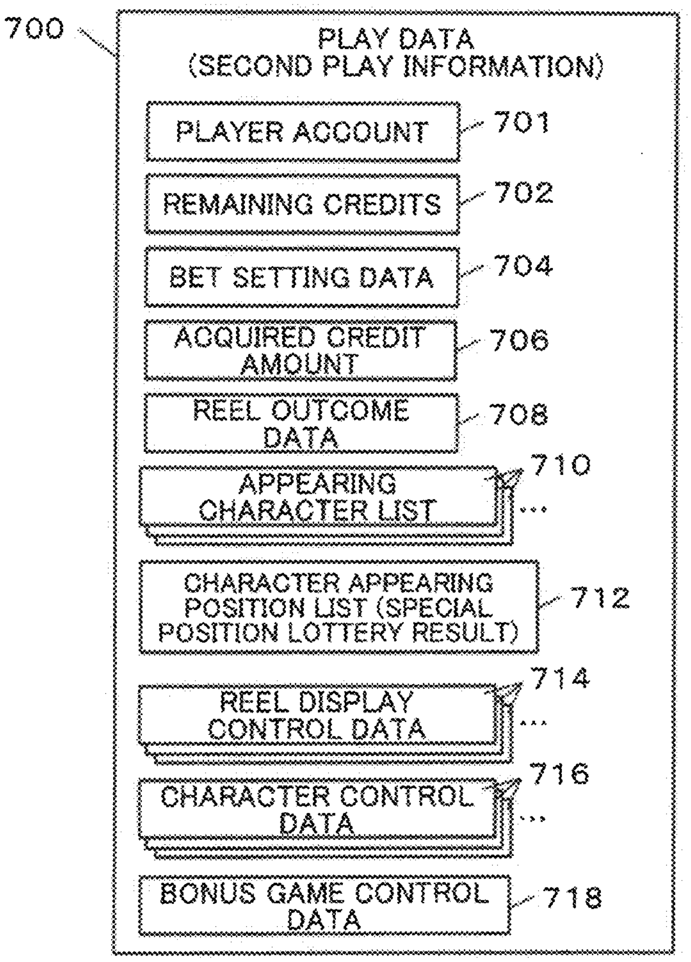

【FIG.25】
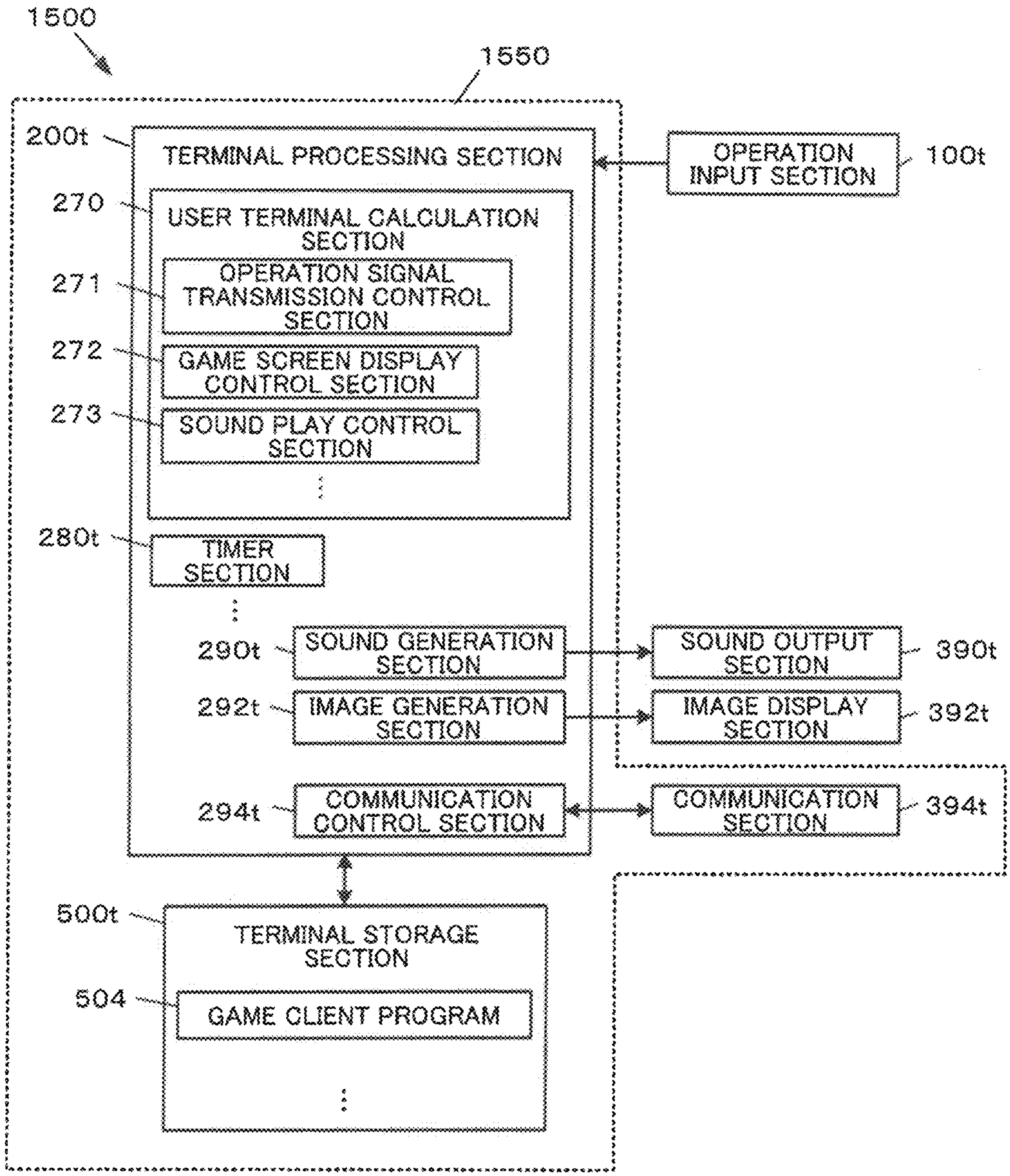

【FIG.26】
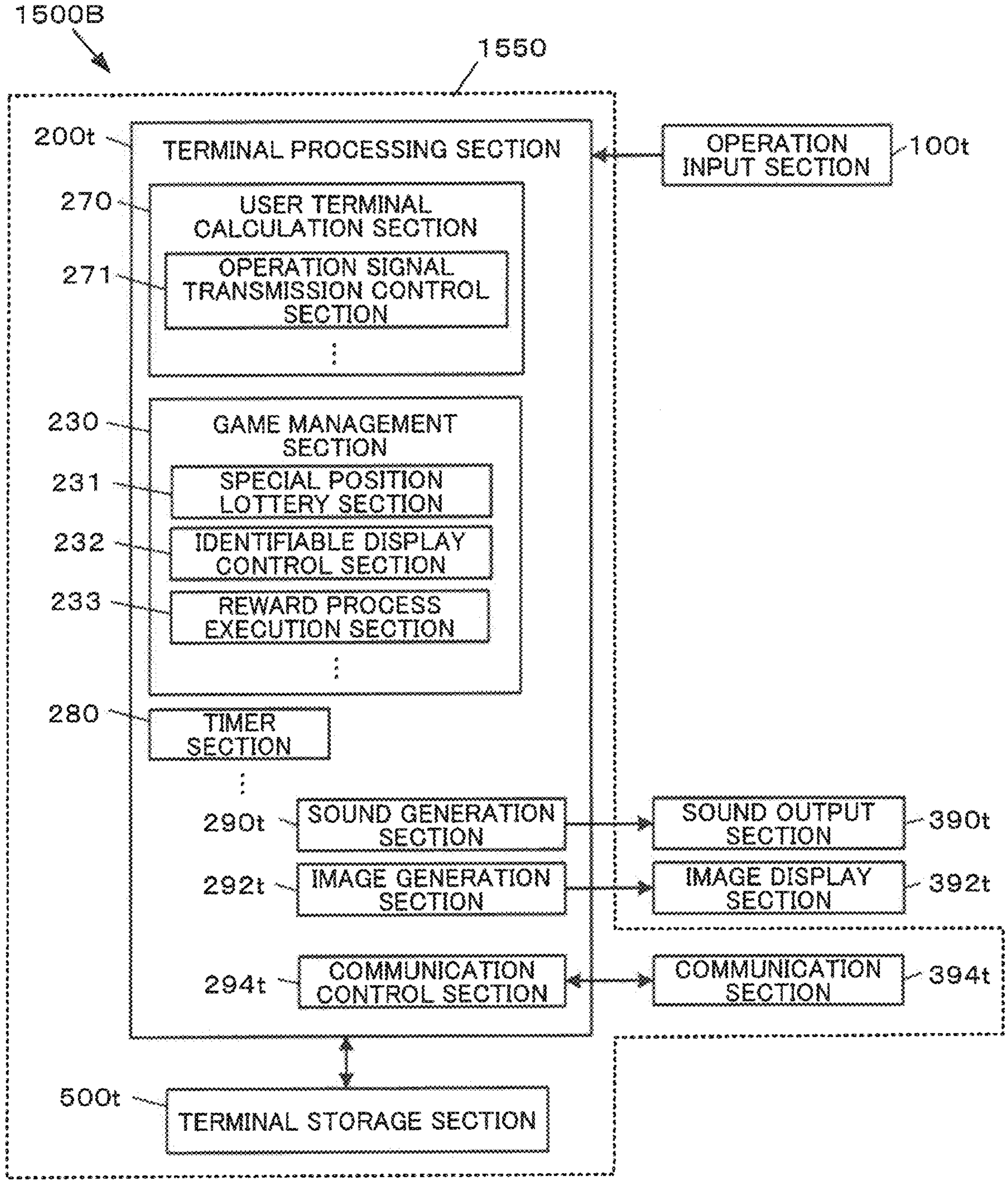

【FIG.27】
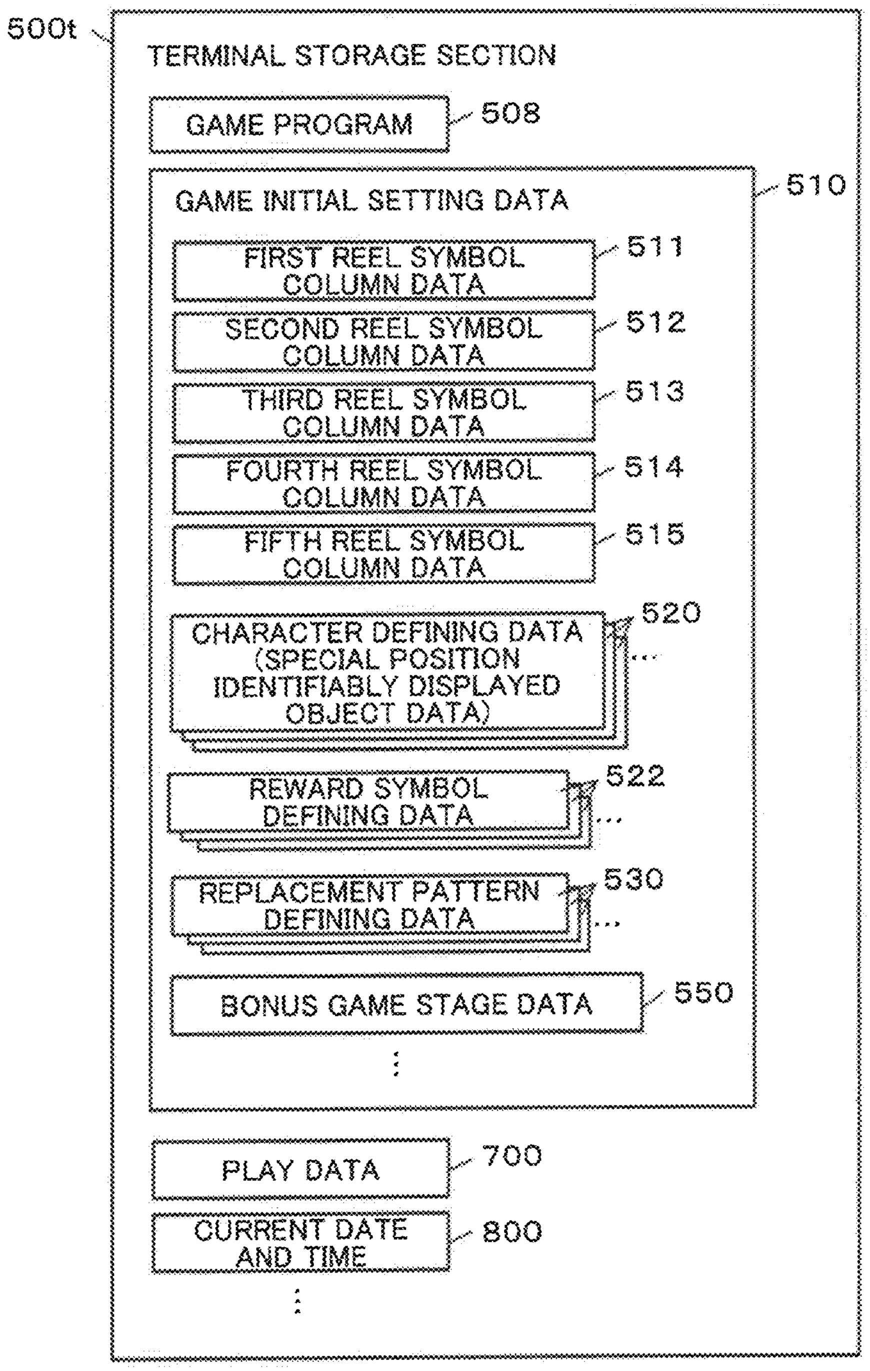

【FIG.28】
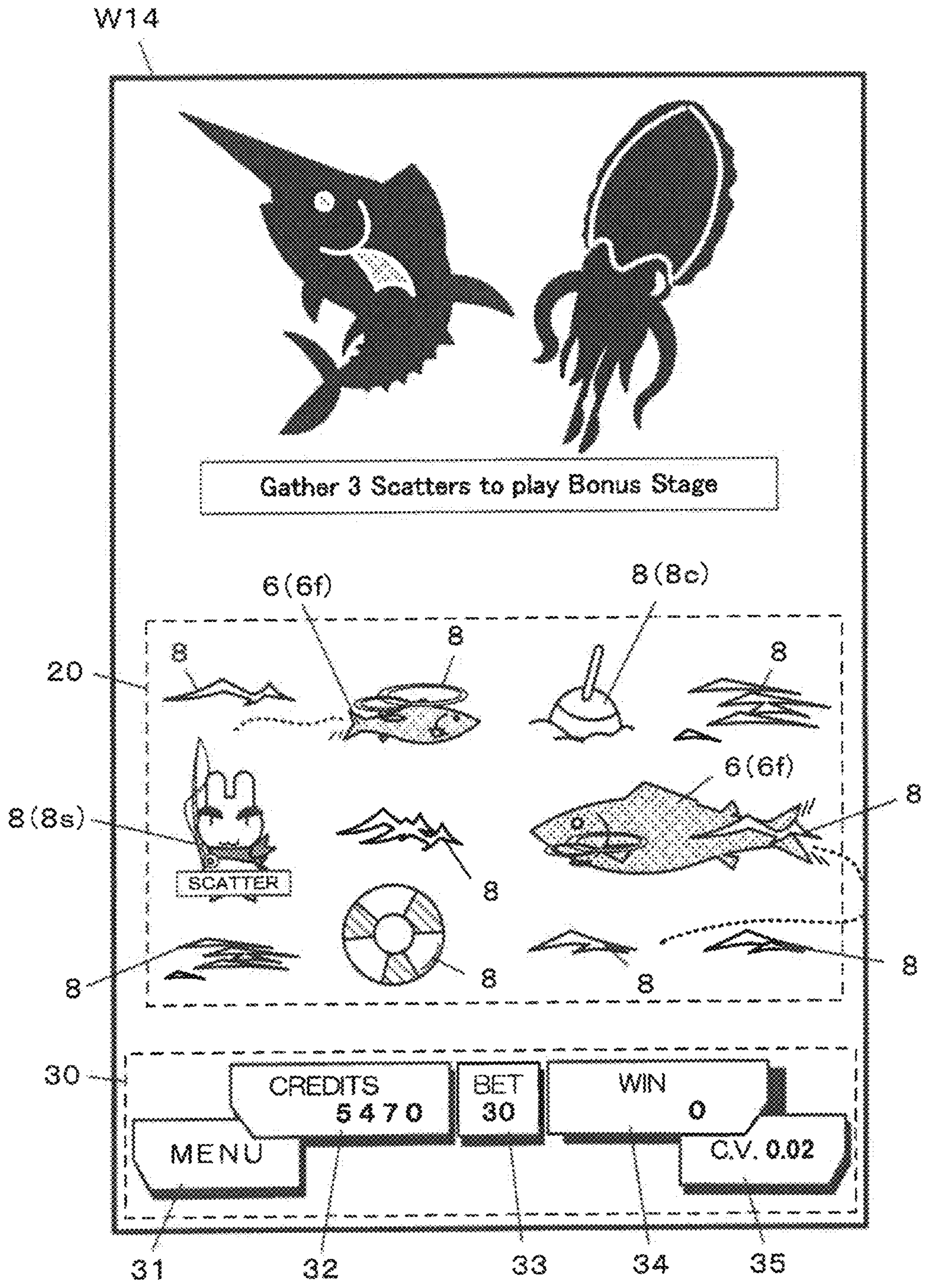

【FIG.29】
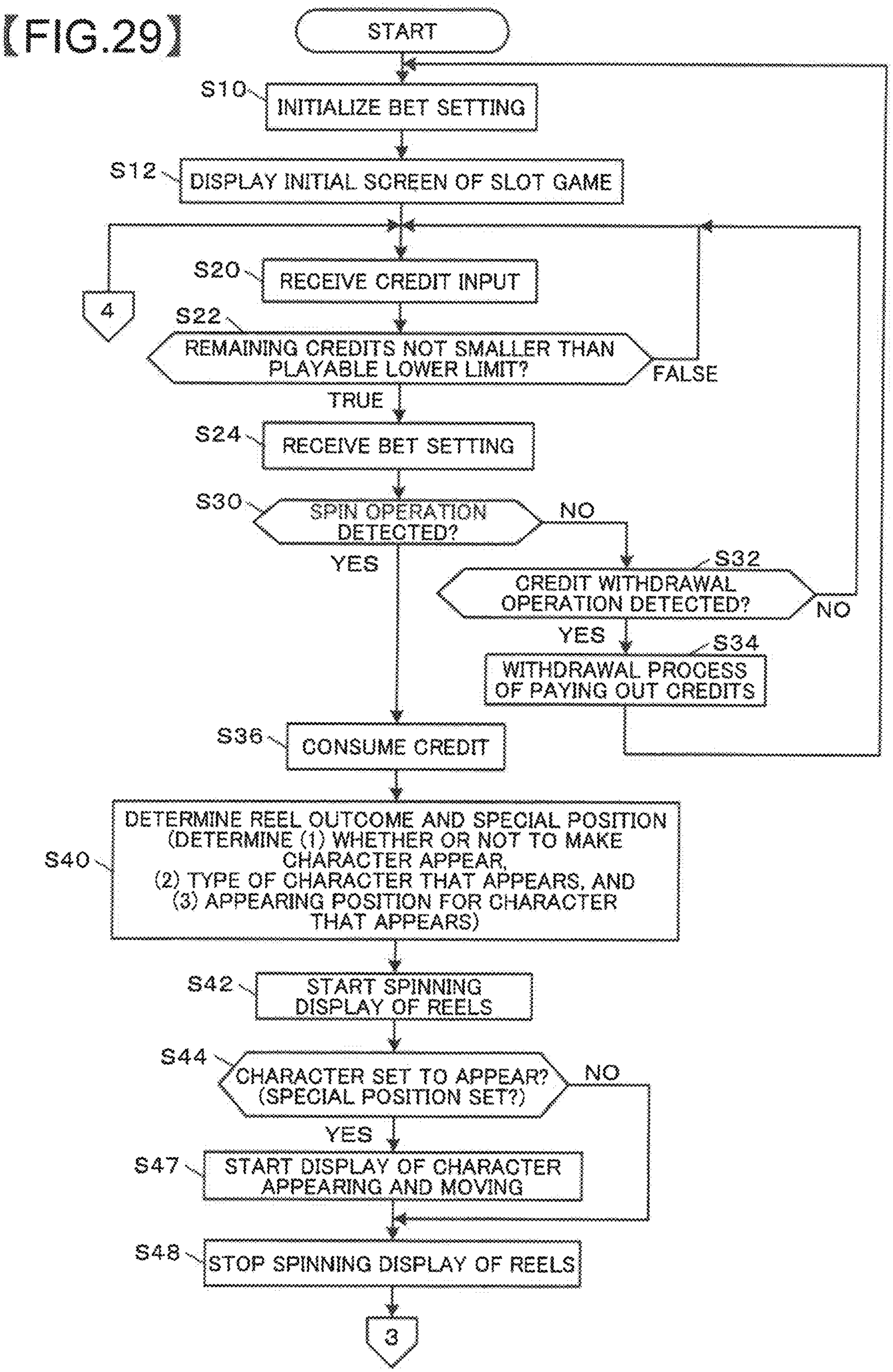

【FIG.30】
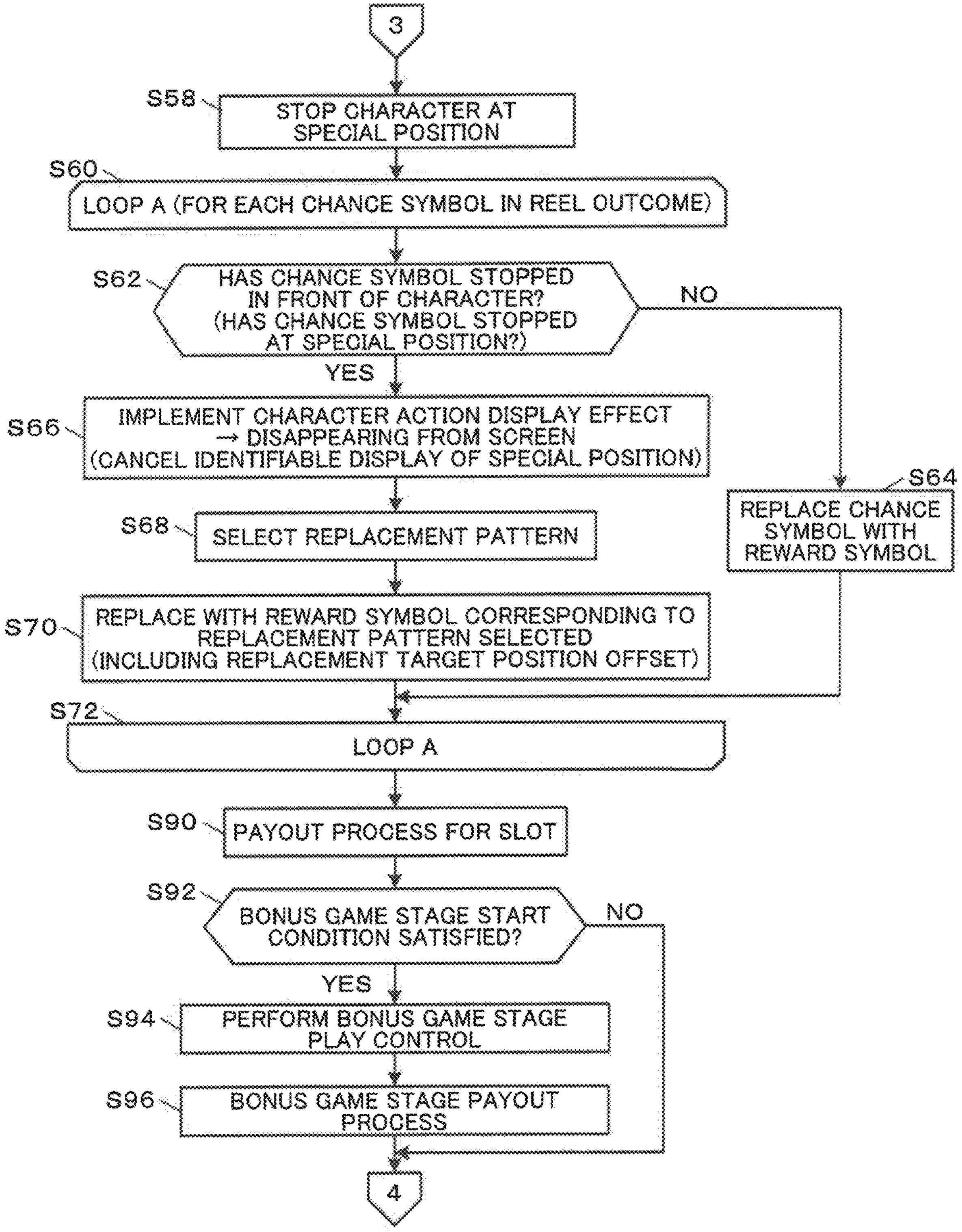

VIDEO SLOT MACHINE, SERVER SYSTEM, AND COMPUTER SYSTEM

Japanese Patent Application No. 2016-240070 filed on Dec. 12, 2016 is hereby incorporated by reference in its entirety.

BACKGROUND

Video slot machines are slot machines with symbol (graphic) columns in spinning reels, in a mechanical slot machine, implemented with video images. The video slot machines have gained popularity with behaviors of reels and payout patterns that would have been unachievable by mechanical slot machines.

For example, Japanese Patent Application Publication No. 2008-36163 discloses a technique of achieving a wide variety of scatter payouts, based on combinations of symbols in video reels and background colors of the video reels. Japanese Patent Application Publication No. 2015-66396 discloses a technique of implementing the background of a video reel with a second video reel and using graphic, formed for the second video reel, for payout patterns.

Among various aspects that can make the video slot machines distinguishable from other machines and more attractive, a process before the outcome is determined and variation of the payout patterns are of particularly important.

SUMMARY

According to one aspect of the invention, there is provided a video slot machine comprising: at least one processor or circuit programmed to execute as:

scroll displaying symbol columns of N reels (N≥3) in a reel display area including two or more symbol stop positions for each of the reels;

performing lottery to determine a special position in the symbol stop positions;

identifiably displaying the special position in the reel display area, before the scroll displaying of the symbol columns stops; and performing a reward process when a symbol stopped at the special position, when the scroll displaying of the symbol columns stops, the symbol being a predetermined chance symbol.

According to the second aspect of the invention, there is provided a server system comprising: at least one processor or circuit programmed to execute as:

scroll displaying symbol columns of N reels (N≥3) in a reel display area including two or more symbol stop positions for each of the reels to control progress of a video slot game in a user terminal;

performing lottery to determine a special position in the symbol stop positions;

identifiably displaying the special position in the reel display area, before the scroll displaying of the symbol columns stops; and performing a reward process when a symbol stopped at the special position, when the scroll displaying of the symbol columns stops, the symbol being a predetermined chance symbol.

According to the third aspect of the invention, there is provided a computer system comprising: a user terminal receiving a user operation; and a server system, the server system comprising at least one processor or circuit programmed to execute as:

scroll displaying symbol columns of N reels (N≥3) in a reel display area including two or more symbol stop positions for each of the reels to control progress of a video slot game in the user terminal;

performing lottery to determine a special position in the symbol stop positions;

identifiably displaying the special position in the reel display area, before the scroll displaying of the symbol columns stops; and performing a reward process when a symbol stopped at the special position, when the scroll displaying of the symbol columns stops, the symbol being a predetermined chance symbol.

BRIEF DESCRIPTION OF THE DRAWINGS

FIG. 1 is a front outer view illustrating an example of a configuration of a video slot machine according to a first embodiment.

FIG. 2 is a diagram illustrating an example of a game screen of a video slot game according to the first embodiment.

FIG. 3 is a diagram illustrating relationship between video reels and a reel display area according to the first embodiment.

FIG. 4 is a diagram illustrating an example of enemy characters (identifiably displayed object corresponding to special positions) according to the first embodiment.

FIG. 5 is a first series of diagrams illustrating how the game screen of the video slot game according to the first embodiment transitions.

FIG. 6 is a second series of diagrams illustrating how the game screen of the video slot game according to the first embodiment transitions.

FIG. 7 is a diagram illustrating an example of how positions as targets of replacement with a reward symbol are distributed and set, when a chance symbol has stopped at a symbol stop position corresponding to a leg section of an enemy character.

FIG. 8 is a diagram illustrating an example of how the positions as the targets of replacement with the reward symbol are distributed and set, when the chance symbol has stopped at a symbol stop position corresponding to a body section of the enemy character.

FIG. 9 is a diagram illustrating an example of how the positions as the targets of replacement with the reward symbol are distributed and set, when the chance symbol has stopped at a symbol stop position corresponding to a head section of an enemy character (normal character).

FIG. 10 is a diagram illustrating an example of how the positions as the targets of replacement with the reward symbol are distributed and set, when the chance symbol has stopped at a symbol stop position corresponding to a head section of an enemy character (special character).

FIG. 11 is a diagram illustrating replacement target position offsetting.

FIG. 12 is a diagram illustrating an example of a payout change process performed when one symbol stop position is redundantly selected as a replacement target.

FIG. 13 is a diagram illustrating an example of a game screen of a bonus game stage according to the first embodiment.

FIG. 14 is a block diagram illustrating an example of a configuration of the video slot machine according to the first embodiment.

FIG. 15 is a diagram illustrating an example of a program and data stored in an information storage section of the video slot machine according to the first embodiment.

FIG. 16 is a first diagram illustrating an example of a data structure of replacement pattern defining data.

FIG. 17 is a second diagram illustrating an example of the data structure of the replacement pattern defining data.

FIG. 18 is a flowchart illustrating a flow of a process performed by the video slot machine according to the first embodiment.

FIG. 19 is a flowchart continuing from FIG. 18.

FIG. 20 is a diagram illustrating an example of a configuration of a game system according to a second embodiment.

FIG. 21 is a block diagram illustrating an example of a configuration of a server system according to the second embodiment.

FIG. 22 is a diagram illustrating an example of a program and data stored in a server storage section according to the second embodiment.

FIG. 23 is a diagram illustrating an example of a data structure of user management data.

FIG. 24 is a diagram illustrating an example of a data structure of play data according to the second embodiment.

FIG. 25 is a block diagram illustrating an example of a configuration of a user terminal according to the second embodiment.

FIG. 26 is a block diagram illustrating an example of a configuration of a user terminal according to a third embodiment.

FIG. 27 is a diagram illustrating an example of a program and data stored in a terminal storage section of the user terminal according to the third embodiment.

FIG. 28 is a diagram illustrating an example of a game screen according to a modification.

FIG. 29 is a flowchart illustrating a flow of a process performed by a video slot game according to the modification.

FIG. 30 is a flowchart continuing from FIG. 29.

DESCRIPTION OF EXEMPLARY EMBODIMENTS

According to one embodiment of the invention, there is provided a video slot machine comprising: at least one processor or circuit programmed to execute as:

scroll displaying symbol columns of N reels (N≥3) in a reel display area including two or more symbol stop positions for each of the reels;

performing lottery to determine a special position in the symbol stop positions;

identifiably displaying the special position in the reel display area, before the scroll displaying of the symbol columns stops; and performing a reward process when a symbol stopped at the special position, when the scroll displaying of the symbol columns stops, the symbol being a predetermined chance symbol.

The "chance symbol" as used herein is a symbol to be a key of getting an opportunity to activate the reward process. In the present embodiment, the special position, determined by the lottery, is identifiably displayed before the scroll displaying of the symbol columns stops, and the reward process is performed in accordance with whether or not the chance symbol has stopped at the special position when the scroll displaying stops Thus, novel display control before the outcome is determined can be implemented. The special position is determined in the symbol stop positions by lottery, and thus a larger variety of payout patterns can be achieved than in a configuration where the special position is fixed. Thus, the video slot machine can be more attractive. The player does not know where the special position is to be set, and thus can enjoy a new type of excitement before the identifiable displaying.

In the video slot machine, the reward process may at least include a process of replacing the chance symbol stopped at the special position with a predetermined reward symbol.

According to this configuration, the reward process is performed to change the chance symbol to the reward symbol. Thus, the arrangement of symbols at the point where the scroll displaying has stopped can be changed in accordance with whether or not the chance symbol has stopped at the special position, to determine the final outcome of the slot machine. Thus, the process before determining the outcome can be entertaining, and the video slot machine can be even more attractive.

In the video slot machine, the reward process may at least include a first replacement process of replacing a symbol in a reel including the chance symbol stopped at the special position with a predetermined reward symbol.

According to this configuration, not only the chance symbol but also the other symbols in the reel including the chance symbol can be replaced with the reward symbol at the same time. Thus, the reward can be more impressive to the player, and the video slot machine can be even more attractive.

In the video slot machine, the reward process may at least include a second replacement process of replacing a symbol in a reel including the chance symbol stopped at the special position as well as a symbol in an adjacent reel with a predetermined reward symbol.

According to this configuration, not only the chance symbol but also the symbols in the reel including the chance symbol as well as the other reel adjacent to the reel including the chance symbol can be replaced with the reward symbol. Thus, the reward can be more impressive to the player, and a wider variety of the payouts can be achieved.

In the video slot machine, the second replacement process may include replacing symbols in X continuous reels (N>X≥2) including the reel including the chance symbol stopped at the special position with the reward symbol.

According to this configuration, the symbol in the X continuous reels including the reel including the chance symbol can be replaced with the reward symbol. Thus, a wide area of reward symbol group can be provided based on the position at which the chance symbol has stopped. Thus, the reward can be more impressive to the player, and a wider variety of the payouts can be achieved.

In the video slot machine, the performing the lottery to determine the special position may include performing lottery to determine a plurality of the special positions, the reward process including changing payout when the second replacement process results in overlapping reels including replacement targets.

According to this configuration, when the second replacement process results in the reels that are the replacement targets overlapping with each other, the payout can be determined in accordance with rarity of the overlapping status. Thus, a wider variety of the payout patterns can be achieved.

In the video slot machine, the reward symbol may be a wild symbol or a scatter symbol.

According to this configuration, the replacement with the wild symbol or the scatter symbol occurs. Thus, the reward process can be more impressive to the player, and the video slot machine can be more attractive.

In the video slot machine, the performing the lottery to determine the special position may include performing lottery to determine a position in the reel display area where a character with a predetermined size is displayed as the special position, the identifiably displaying the special position may include displaying the character at the special position.

According to this configuration, the character can be the identifiably displayed object at the special position. Thus, the visibility of the reels, regarding the symbols, can be improved.

In the video slot machine, the size of the character may at least include two of the symbol stop positions adjacent to each other.

According to this configuration, the visibility of the special position can further be increased. The special position is set to be at a plurality of continuous symbol stop positions, and thus the player can feel that there is a higher chance of the chance symbol stopping at the symbol stop position, and thus may expect to obtain a larger payout to feel more excited. The character can be drawn in a wide area, and thus there is more space for adding display effects such as a certain movement of the character that has appeared until the reels stop. With such effect effectively utilized, the process before the outcome is determined can be more exciting, and the video slot machine can be more attractive.

In the video slot machine, the performing the reward process may include performing a first reward process when a stop position of the chance symbol overlaps with a first section of the character, and performing a second reward process when the stop position overlaps with a second section of the character.

According to this configuration, different reward processes can be performed in accordance with the section of the character, with a size including a plurality of continuous symbol stoop positions, overlapped with the chance symbol. Thus, a wider variety of the processes before the outcome is determined and the payout patterns can be achieved.

In the video slot machine, the character may at least include a first character and a second character, the performing the lottery to determine the special position may include performing lottery to determine a first special position where the first character is displayed and a second special position where the second character is displayed, the identifiably displaying the special position may include displaying the first character at the first special position and displaying the second character at the second special position, the performing the reward process may include performing a first reward process when a stop position of the chance symbol overlaps with the first character, and performing a second reward process when the stop position overlaps with the second character.

According to this configuration, a plurality of types of characters are prepared, and different reward processes can be performed in accordance with the type of the character corresponding to the position where the chance symbol has stopped. Thus, a wider variety of the processes before the outcome is determined and the payout patterns can be achieved.

In the video slot machine, the first reward process may at least include a process of replacing a first number of symbols, and may include the chance symbol stopped at the special position, with the predetermined reward symbol, the second reward process at least including replacing a second number of symbols, including the chance symbol stopped at the special position, with the reward symbol, the second number of symbols being larger than the first number of symbols.

According to this configuration, the number of symbols to be replaced with the reward symbol can be charmed in accordance with the type of the reward process. Thus, an even wider variety of the processes before the outcome is determined and the payout patterns can be achieved.

In the video slot machine, the video slot machine may have a bonus game stage in which attacking, capturing, or acquiring is performed on a target object or a target character, the character may be the target object or the target character appearing in the bonus game stage.

According to this configuration, the target object or the target character, which is the target of the action in the bonus game stage, can appear as the identifiably displayed object, that is, the character corresponding to the special position in the normal game screen of the slot game before the bonus game stage. Thus, the game world can be more consistent between the normal game screen of the slot game and the bonus game stage, whereby a video slot machine with a consistent display content can be implemented.

According to another embodiment of the invention, there is provided a server system comprising: at least one processor or circuit programmed to execute as:

scroll displaying symbol columns of N reels ($N \geq 3$) in a reel display area including two or more symbol stop positions for each of the reels to control progress of a video slot game in a user terminal;

performing lottery to determine a special position in the symbol stop positions;

identifiably displaying the special position in the reel display area, before the scroll displaying of the symbol columns stops; and performing a reward process when a symbol stopped at the special position, when the scroll displaying of the symbol columns stops, the symbol being a predetermined chance symbol.

According to this configuration, a server system having the effects described above can be implemented as a server system that enables a video slot game to be played with a user terminal.

According to another embodiment of the invention, there is provided a computer system comprising: a user terminal receiving a user operation; and a server system, the server system comprising at least one processor or circuit programmed to execute as:

scroll displaying symbol columns of N reels ($N \geq 3$) in a reel display area including two or more symbol stop positions for each of the reels to control progress of a video slot game in the user terminal;

performing lottery to determine a special position in the symbol stop positions;

identifiably displaying the special position in the reel display area, before the scroll displaying of the symbol columns stops; and performing a reward process when a symbol stopped at the special position, when the scroll displaying of the symbol columns stops, the symbol being a predetermined chance symbol.

The "computer system" as used herein may be a system including a single computer, and may be a system including a plurality of computers that are connected to each other to be capable of performing data communications with each other through a communication line.

According to this configuration, a computer system that can achieve the effects described above can be implemented.

Exemplary embodiments of the present invention are described below. It is a matter of course that modes to which the present invention can be applied is not limited to the embodiments described below.

First Embodiment

FIG. 1 is a front outer view illustrating an example of a configuration of a video slot machine 1300 to which the present invention is applied. The video slot machine 1300 includes a casing 1301 having a lower portion provided with an operation board 1302 having an upper surface provided with a spin button 1304.

The video slot machine 1300 further includes a token input device 1340, a paper money input device 1342, and a medium reading device 1344. The token input device 1340, serving as a playing fee input section, is provided to be farther than the operation board 1302, and is used for inputting a token 98. The medium reading device 1344 reads information, required for paying the playing fee, from an electronic payment medium 99.

For example, the electronic payment medium 99 may be implemented with an admission ticket issued by a manager of the video slot machine 1300, credit card, prepaid card, integrated circuit (IC) card, smartphone, a wearable computer, or the like. In the example illustrated in FIG. 1, the electronic payment medium 99 is illustrated to be a card type and the medium reading device 1344 is illustrated to have a card insert port. Note that the electronic payment medium 99 and the medium reading device 1344 may establish connection via near field communications to write and read information to and from the electronic payment medium 99.

The video slot machine 1300 further includes a touch panel 1306 and a speaker 1310 in an upper portion of the casing 1301. The touch panel 1306 functions as an image display device and a contact position input device. The easing 1301 incorporates a control board 1350.

The control board 1350 is a board dedicated for the video slot machine 1300. The control board 1350 includes a microprocessor of various types (such as a central processing unit (CPU) 1351, a graphics processing unit (GPU), and a digital signal processor (DSP)), an IC memory 1352 of various types (such as a video random access memory (VRAM), a RAM, and a read only memory (RUM)), an interface (I/F) controller 1357, and the like.

For example, the I/F controller 1357 includes 1) a driver circuit for the touch panel 1306, 2) a circuit that receives a signal from the spin button 1304, 3) an output amplifier circuit that outputs a sound signal to the speaker 1310, 4) a signal input/output circuit for playing fee input sections such as the token input device 1340, the paper money input device 1342, and the medium reading device 1344, and the like.

These elements of the control board 1350 are electrically connected to each other via a bus circuit, to be capable of exchanging data and signals. The control board 1350 may be partially or entirely implemented with an Application Specific Integrated Circuit (ASIC), a field-programmable gate array (FPGA), or a System on a Chip (SoC).

The control board 1350 executes a predetermined program to perform a calculation process, and enables slot play by controlling the components of the video slot machine 1300 in accordance with an operation input using the spin button 1304 and the touch panel 1306. The video slot machine 1300 has a required program and various types of setting data stored in advance in the IC memory 1352. Note that the program and data can be downloaded from an external device every time the machine is started. In such a configuration, the video slot machine 1300 may include a communication device 1353.

The control board 1350 performs control so that the video slot machine 1300 generates an image on a game screen of a slot game based on a result of the operation input using the spin button 1304, the touch panel 1306, or the like, causes the touch panel 1306 to display the image, generates a sound signal corresponding to sound effects and operation sounds, and causes the speaker 1310 to emit the sound. Thus, the player can enjoy the slot game by operating the spin button 1304 while watching the game screen displayed on the touch panel 1306 and listening to the game sound from the speaker 1310.

One or two of the token input device 1340, the paper money input device 1342, and the medium reading device 1344 may be omitted. Furthermore, a playing fee input section other than these may be employed. The video slot machine 1300 includes a power source device (not illustrated) and the like as appropriate.

FIG. 2 is a diagram illustrating an example of a game screen according to the present embodiment. A game screen W2 according to the present embodiment is displayed on the touch panel 1306. The game screen W2 according to the present embodiment includes a reel display area 20 and an information display section 30.

The reel display area 20 includes two or more symbol stop positions for each of N reels (N≥3). Symbol columns of the reels are displayed in a scrolling manner so that an image displayed replicates actual spinning reels.

In the present embodiment, a design illustrated in FIG. 3 is employed where five video reels (first video reel 21 to fifth video reel 25) are arranged in a left and right direction, and three of continuous symbols 8 in a column of symbols 8 (symbol column) set to each video reel is displayed on the reel display area 20. Thus, in the present embodiment, a total of 15 (5×3) symbol stop positions 7 (areas sectionalized with broken lines in the figure) are prepared.

Edges of the video reels, clearly illustrated in FIG. 3, are not displayed in the reel display area 20. The number of symbols, in the symbol column of each video reel, to be displayed in the reel display area 20 can be set as appropriate. Thus, the number of symbol stop positions 7 can be set as appropriate. For example, the first video reel 21 and the second video reel 22 may each have three symbol stop positions 7, whereas the third video reel 23 to the fifth video reel 25 may each have four symbol stop positions 7. The number of symbol stop positions 7 may be variable.

The symbol 8 set to be in the video reels (the first video reel 21 to the fifth video reel 25) according to the present embodiment may include a scatter symbol 8*s* and a chance symbol 8*c*.

The design of the chance symbol 8*c* can be set as appropriate. The slot game according to the present invention is based on a theme of a shooting game of shooting down a character 6 (see FIG. 2). Thus, the chance symbol 8*c* is designed based on a theme of a target scope. An area inside an outer circumference circle of the symbol is transparent except for a cross part, and thus a player can see the background through the symbol.

FIG. 4 is a diagram illustrating an example of the character 6 according to the present embodiment. The character 6 is designed to have a size including one or a plurality of symbol stop positions 7 adjacent to each other. In the present embodiment, the character 6 is designed to have a head section, a body section, and a leg section each including one of three continuous symbol stop positions 7 that are adjacent to each other in a vertical direction (a symbol flowing direction of the video reel: rotation display direction: scroll display direction). The character 6 includes at least two types of characters including a normal character 6*a* and a special character 6*b*.

The design, the size, and the type of the character 6 may be set as appropriate to be different from those described above, depending on the theme of the slot game or a setting in the game world. For example, the height of the character 6 is not limited to that for three symbol stop positions as in the present embodiment, and a character of a type with a height for two symbol stop positions may be provided. The width of the character 6 is not limited to that for a single reel as in the present embodiment, and a character of a type wide enough to include two or more adjacent reels may be provided. The character 6 may be designed as a group of a plurality of characters.

Referring back to FIG. 2, the information display section 30 in the game screen W2 includes 1) a menu icon 31 for performing an operation of calling a menu, 2) remaining credits 32 indicating an amount of betting units (illustrated as "CREDITS" in the figure, and is hereinafter referred to as "credit") possessed by the player, 3) bet setting display 33 indicating the current bet setting status, 4) acquired credit 34 indicating the amount of credits acquired after the game has started, and 5) a rate display section 35 displaying what is known as a coin value indicating a premium per bet (or one coin).

FIG. 5 to FIG. 6 are each a series of diagrams illustrating how the game screen of the video slot game according to the present embodiment transitions. Note that only a limited area around the reel display area 20 in the game screen is illustrated for easier understanding.

As illustrated in an example of a game screen W4 in FIG. 5(1), when the player presses the spin button 1304, the symbol columns in the video reels are displayed in a scrolling manner to circulate in a predetermined direction, so that the first video reel 21 to the fifth video reel 25 (see FIG. 3) replicate actual spinning reels in the reel display area 20.

Next, as illustrated in an example of a game screen W6 in FIG. 5(2), the characters 6 appear to be displayed on the background of the reel display area 20. For each play, a random lottery process (for example, a process of making determination under a rule set in advance, based on values of random numbers generated by random number generation) is performed to determine 1) whether or not the character 6 appears, 2) the type of the appearing characters 6, and 3) the position (special position) of the character 6.

When the character 6 is determined to appear, control is performed so that two characters 6 appear at once and each appear behind the first video reel 21 to the fifth video reel 25. The character 6 that has appeared has the head section, the body section, and the leg section respectively corresponding to an upper section, a middle section, and a lower section of the symbol stop positions 7 prepared to be in a 5 (horizontal)×3 (vertical) arrangement. Thus, the character 6 functions as a special position identifiably displaying object with which three continuous special positions are identifiably displayed.

The character 6 that has appeared has an operation controlled to attack the player. For example, the character 6 having a gun has an operation controlled to fire the gun. The character 6 with a sword has an operation controlled to move toward the player (move closer in the screen).

Next, as illustrated in an example of a game screen W8 in FIG. 5(2), after the characters 6 have appeared, display control is performed so that the first video reel 21 to the fifth video reel 25 displayed on the reel display area 20 sequentially stop.

Then, when all of the video reels stop as illustrated in an example of a game screen W10 in FIG. 6(1), a tentative outcome of the slot machine is determined. When the symbols stopped in the reel display area 20 include the chance symbol 8*c*, replacement of symbols with a reward symbol 10 is performed in accordance with the position of the stopped symbol.

Specifically, as illustrated in FIG. 6(1) When the chance symbol 8*c* stops at the symbol stop position without the character 6, that is, at a position other than the special position, one chance symbol 8*c* is replaced with one reward symbol 10 to be displayed as illustrated in FIG. 6(2). Thus, the outcome of the reels is determined.

In the present embodiment, the reward symbol 10 is fixed to the wild symbol. However, this should not be construed in a limiting sense. The reward symbol 10 may be fixed to a symbol advantageous to the player, such as a scatter symbol for example. Alternatively, a plurality of types of replacement options, such as the wild symbol and the scatter symbol may be prepared, and the reward symbol 10 may be replaced with a replacement option selected by lottery at each replacement occasion.

Replacement display effect of shooting the target scope with a gun is displayed, and then the replacement to the reward symbol 10 is completed. Specifically, sound of a gunshot is emitted, and display control is performed to provide display effect of a bullet hitting the background, which can be seen through the chance symbol 8*c*, to leave a bullet mark. Preferably, the bullet mark is included in the design of the reward symbol 10.

When the chance symbol 8*c* stops at the symbol stop position 7 overlapped with the character 6, that is, when the chance symbol 8*c* stops at the special position, the number of reward symbols 10 obtained by the replacing and the relative positional relationship between the symbols to be replaced, that is, a replacing pattern is changed in accordance with the section of the character 6 corresponding to the symbol stop position 7 at which the chance symbol 8*c* has stopped.

Specifically, when the chance symbol 8*c* stops at the symbol stop position 7 corresponding to the leg section of the character 6 as illustrated in FIG. 7 (FIG. 7(1)), gun shooting display effect including destroying the character 6 (destroying display effect: for example, display control with which the character 6 is hit by a bullet and disappears in a collapsing manner) is performed, and then a replacing pattern is applied in which the chance symbol 8*c* and other symbols on upper right and left of the chance symbol 8*c* determined as replacement targets are replaced with the reward symbol 10 (FIG. 7(2)).

When the chance symbol 8*c* stops at the symbol stop position 7 corresponding to the body section of the character 6 as illustrated in FIG. 8 (FIG. 8(1)), the gun shooting display effect including destroying the character 6 is similarly performed, and then a replacing pattern is applied in which the chance symbol 8*c* and other symbols in the video reel including the chance symbol 8*c* determined as the replacement targets are replaced with the reward symbol 10 (FIG. 8(2)). The replacement targets may be only those displayed in the reel display area 20 or may further include other symbols not displayed in the reel display area 20. A result of payout calculation or the like is the same in both cases.

In the example illustrated in FIG. 8, the replacing of the three symbols is clearly indicated with the symbol stop positions 7 corresponding to the replacement targets each individually replaced with the reward symbol 10, and the outer circumferences of the reward symbols 10 highlighted (see FIG. 8(2)). Here, the three reward symbols 10 are continuously arranged in the vertical direction as a result of the replacement, and thus a replacing pattern may be applied in which one large reward symbol 11*a* (one large wild symbol designed to be provided over the three symbol stop positions 7) may be provided as a result of the replacement.

As illustrated in FIG. 9, when the character 6 is the normal character 6*a* and the chance symbol 8*c* stops at the symbol stop position 7 corresponding to the head section of the character 6 (FIG. 9(1)), the gun shooting display effect including destroying the character 6 is performed, and then a replacing pattern is applied in which the replacement targets to be replaced with the reward symbols 10 are set to be the chance symbol 8*c*, the other symbols in the video reel (the fourth video reel 24 in the illustrated example) including the chance symbol 8*c*, and symbols at predetermined relative positions in adjacent video reels (the third video reel 23 and the fifth video reel 25 in the illustrated example) adjacent to the video reel including the chance symbol 8*c* (FIG. 9(2)).

In the example illustrated in FIG. 9, the replacement targets are set to form a shape of the letter T based on the chance symbol 8*c*. However, the relative positional relationship among the replacement target symbols is not limited to this. For example, the replacing pattern for setting the relative positional relationship of the replacement targets to be in a cross shape or an inverted V shape with the chance symbol 8*c* at the top end may be employed.

As illustrated in FIG. 10, when the character 6 is the special character 6*b* and the chance symbol 8*c* stops at position corresponding to the head section of the character 6, the gun shooting display effect including destroying the character 6 is performed, and then a replacing pattern is applied in which the replacement targets to be replaced with the reward symbols 10 are set to be the chance symbol 8*c*, all the symbols in the video reel (the fourth video reel 24 in the illustrated example) including the chance symbol 8*c* in the reel display area 20, and all the symbols in other video reels in a predetermined range (the third video reel 23 and the fifth video reel 25 at adjacent positions in the illustrated example) in the reel display area 20. Thus, in this embodiment, a total of nine symbols are replaced.

In the example illustrated in FIG. 10, the replacing of the nine symbols is clearly indicated with the symbol stop positions 7 corresponding to the replacement targets each individually replaced with the reward symbol 10, and the outer circumferences of the reward symbols 10 highlighted. Here, the nine reward symbols 10 are arranged in the vertical and the horizontal direction as a result of the replacement, and thus a replacing pattern may be applied in which one large reward symbol 11*c* designed to be provided over the nine symbol stop positions 7 may be provided as a result of the replacement.

The replacing pattern illustrated in FIG. 10 might result in symbols outside the reel display area 20 being the replacement targets. In such a case, as illustrated in FIG. 11, setting positions of the replacement targets are offset (shifted) so that all the replacement targets can be within the reel display area 20.

Specifically, FIG. 11(1) illustrates an example where the chance symbol 8*c* has stopped at the head section of the special character 6*b* in the fifth video reel 25. Direct application of the replacing pattern as illustrated in FIG. 10 results in a less advantageous result for the player with only a total of six symbols in two reels of the fourth video reels 24 and the fifth video reel 25 replaced as illustrated in FIG. 11(2). Thus, as illustrated in FIG. 11(3), the setting positions of the replacement targets are offset toward the left into the screen by a distance corresponding to a single reel so that all the nine replacement targets can be within the reel display area 20. Thus, the nine symbols in the third video reel 23 to the fifth video reel 25 are set as the replacement targets. This process is referred to as "replacement target position offsetting".

The replacement target position offsetting might result in the symbol stop positions to be the replacement targets overlapping as illustrated in FIG. 12.

Specifically, FIG. 12(1) illustrates the chance symbol 8*c* stopped at the head section of the character 6(6*b*) in each of the third video reel 23 and the fifth video reel 25. In this situation, the replacement target position offsetting illustrated in FIG. 11 results in the symbol stop positions corresponding to the replacement target overlapping in the third video reel 23 and the fourth video reel 4 as illustrated in FIG. 12(2). In other words, the reels corresponding to the replacement target overlap. This can be regarded as setting a plurality of reward symbols 10 at a single stop position.

Thus, when a single symbol stop position 7 is redundantly selected as the replacement target with a single spinning (single play), an overlapping reward symbol 12 is identifiably displayed as illustrated in FIG. 12(3), with the payout changed.

For example, FIG. 12 illustrates an example of a winning combination with rows each including five symbols in the horizontal direction based on the reward symbols 10 in the second video reel 22 and the third video reel 23, based on a position of a symbol 8*d* with a design of a carrot. In this example, the standard multiplier of the winning combination with rows each including five symbols in the horizontal direction is ×10. Furthermore, a bonus multiplier of ×2 is set for the symbol stop position 7, contributing to the pay, redundantly selected as the replacement target. Thus, the payout is calculated based on the multiplier of ×20 (10×2). The bonus multiplier is not limited to 2 and may be set as appropriate. For example, the multiplier may be determined based on a predetermined function to increase as the number of overlapping symbol stop positions 7 or the number of overlapping reek increases.

In the video slot according to the present embodiment, a bonus game stage can be played when the outcome is determined to include three or more scatter symbols 8*s* (see FIG. 2) in the reel display area 20.

FIG. 13 illustrates a game screen W12 representing an example of the bonus game stage according to the present embodiment. In this example, the player plays a game of touching and selecting one of a predetermined number of characters 6 displayed over the entire screen of a touch panel 1306 to attack the selected character 6. The characters 6 are allocated with different bonus credits set in advance. When the player performs a selection operation, display effect of shooting down the character 6 selected is performed, and the bonus credit allocated to the character 6 is paid out to the player. Then, the bonus game is terminated. After the bonus game ends, the game screen returns to a normal display of the slot game (see FIG. 2).

It is a matter of course that the details of the bonus game stage can be set as appropriate, as long as the details conform to the theme of the slot game or the game world setting. Specifically, actions such as attacking, capturing, collecting, saving, and acquiring are performed on a target object or a target character in the slot game.

[Configuration]

FIG. 14 is a block diagram illustrating an example of a configuration of the video slot machine 1300 according to the present embodiment. The video slot machine 1300 according to the present embodiment includes an operation input section 100, a processor section 200*p*, a sound output section 390, an image display section 392, and an information storage section 500*d*. When the video slot machine 1300 needs to communicate with an external device, the control board 1350 further includes a communication unit 394 as appropriate.

The operation input section 100 is for inputting various operations by the player. This corresponds to the spin button 1304 and the touch panel 1306 in FIG. 1.

The processor section 200*p* is implemented with electronic parts such as a microprocessor (e.g., CPU and GPU), an ASIC, and an IC memory. The processor 200*p* performs input/output control to exchange data with each of the functional sections including the operation input section 100 and the information storage section 500*d*. The processor section 200*p* executes various calculation processes based on a predetermined program or data, an operation input signal from the operation input section 100 to entirely control the operation of the video slot machine 1300.

The processor section 200*p* according to the present embodiment includes a game management section 230, a timer section. 280, a sound generation section 290, and an image generation section 292. Note that functional sections other than these may be included as appropriate. When the video slot machine 1300 needs to communicate with an external device, a communication control section 294 may further be provided.

The game management section 230 performs various processes related to execution and management of the video slot game in which a symbol column of each of N reels (N≥3) is displayed in a scrolling manner in the reel display area having two symbol stop positions or more. Specifically, the game management section 230 according to the present embodiment includes a special position lottery section 231, an identifiable display control section 232, and a reward process execution section 233.

The special position lottery section 231 performs a lottery to determine the special position in the symbol stop positions 7 (see FIG. 3). In the present embodiment, this corresponds to 1) an appearing/absence determining lottery process for determining whether or not to make the character 6 appear, and 2) an appearing position determining lottery process for determining a reel the background of which to include the appearing character 6. The latter lottery process is substantially equivalent to a lottery process for determining the special position.

The identifiable display control section 232 identifiably displays the special position in the reel display area before the scroll displaying of the symbol columns stops. In the present embodiment, this corresponds to 1) a type selection lottery process for selecting the type of the character 6 that appears, 2) an identifiable displaying process for displaying the character 6 of the selected types so that the character 6 appears at the special position in the reel display area 20, and 3) a post-appearing operation control process.

The reward process execution section 233 performs a reward process when a chance symbol stops at the special position when the scroll displaying of the reels (symbol columns) ends.

Specifically, the reward process execution section 233 performs the reward process including: 1) a first replacement process for replacing a chance symbol that has stopped at the special position in the reel with a predetermined reward symbol, and a second replacement process of replacing symbols in the reel including the chance symbol stopped at the special position as well as symbols in adjacent reels with the predetermined reward symbols.

Specifically, the second replacement process includes replacing symbols in X continuous reels (N≥2) including the reek including the chance symbol that has stopped at the special position with the reward symbols, and changing the payout when the reels corresponding to the replacement target overlap.

In the present embodiment, the example illustrated in FIG. 8 corresponds to the first replacement process and the examples illustrated in FIG. 9 or FIG. 10 correspond to the second replacement process. A configuration of performing only one of the first replacement process and the second replacement process may be employed.

The reward process execution section 233 performs a first reward process when the chance symbol stops at a position overlapping with a first section of the character, and performs a second reward process when the chance symbol stops at a position overlapping with a second section of the character.

Specifically, the first reward process at least includes replacing a first number of symbols, including the chance symbol stopped at the special position, with the predetermined reward symbol. The second reward process at least includes replacing a second number of symbols, larger than the first number of symbols, including the chance symbol stopped at the special position with the reward symbol.

In the present embodiment, this corresponds to selecting a replacing pattern in accordance the section of the character 6 (the head section, the body section, or the leg section) corresponding to the special position at which the chance symbol 8*c* has stopped, determining the replacement target based on the replacing pattern thus selected, and replacing the replacement target with the reward symbol 10. In the present embodiment, the first section corresponds to the body section or the leg section, and the example illustrated in FIG. 7 or FIG. 8 corresponds to the first reward process. The second section corresponds to the head section, and the example illustrated in FIG. 9 or FIG. 10 corresponds to the second reward process.

The timer section 280 uses a system clock to obtain the current date and time, a time limit, and the like.

The sound generation section 290 is implemented with an integrated circuit (IC) or by executing software that generates sound data and performs decoding, and generates or decodes sound data on a sound related to the video slot, background music (BGM), and a character voice.

The sound output section 390 outputs sound based on the input sound signal. The sound output section 390 corresponds to the speaker 1310 in. FIG. 1.

The image generation section 292 can generate a game screen and the like. The image signal for displaying the game screen can be output to the image display section 392.

The image display section 392 displays the game screen based on the image signals input from the image generation section 292. The image display section 392 may be implemented with an image display device such as a flat panel display, a cathode ray tube (CRT), a projector, or a head-mounted display. The image display section 392 corresponds to the touch panel 1306 in the example illustrated in FIG. 1.

The communication control section 294 performs a data communication process for data communications, and exchanges data with an external device through the communication section 394.

The communication section 394 connects to a communication line to implement communications. The communication section 394 is implemented with a transceiver, a modem, a terminal adapter (TA), a jack for a communication cable, a control circuit, and the like.

The information storage section 500*d* stores a program and various types of data for implementing various functions of the processor section 200*p* for controlling the video slot machine 1300. The information storage section 500*d* is used as a work area for the processor section 200*p*, and temporarily stores the results of calculations performed by the processor section 200*p* based on various programs. The function of the information storage section 500*d* is implemented with an IC memory (e.g., RAM and ROM), a magnetic disk (e.g., hard disk), an optical disk (e.g., CD-ROM and DVD), an online storage, or the like corresponding to the IC memory 1352 in the control board 1350 in the example illustrated in FIG. 1. When the video slot machine 1300 can communicate with an external device, the function may be implemented with an external storage prepared on a network.

FIG. 15 is a diagram illustrating an example of a program and data stored in the information storage section 500*d* according to the present embodiment. The information storage section 500*d* stores therein in advance, a slot game program 507, first reel symbol column data 511, second reel symbol column data 512, third reel symbol column data 513, fourth reel symbol column data 514, fifth reel symbol column data 515, character defining data 520, reward symbol defining data 522, replacement pattern defining data 530, and bonus game stage data 550.

The information storage section 500*d* stores therein data, sequentially generated and managed, including play data 700 and current date and time 800. The information storage section 500*d* may further store therein various types of information such as a timer, a counter, and various flags.

The slot game program 507 is a program read and executed by the processor section 200*p* for implementing functions of the game management section 230. The program may include programs for implementing the functions of the sound generation section 290, the image generation section 292, and the communication control section 294.

The first reel symbol column data 511 to the fifth reel symbol column data 515 respectively define the symbol column for the first video reel 21 to the fifth video reel 25 (see FIG. 3).

The character defining data 520 defines an identifiably displayed object at the special position, and is prepared for each type of character 6 (see FIG. 4). One character defining data 520 includes model data and texture data for displaying the corresponding type of character 6 on the game screen as well as motion data for controlling operations of the character 6.

The reward symbol defining data 522 defines the reward symbol 10. The reward symbol defining data 522, which defines the reward symbol 10, may also be prepared for each type of large reward symbols 11*a* to 11*c* (see FIG. 8 to FIG. 10) and for the overlapping reward symbol 12 (see FIG. 12), in the game using these symbols.

The replacement pattern defining data 530 defines a pattern for replacing the chance symbol 8*c* and other symbols in its periphery with the reward symbol 10.

As illustrated in FIG. 16 and FIG. 17, one replacement pattern defining data 530 includes an applying condition 531 defining a condition for applying the defining data, replacement target relative position defining data 536, and replacement target position offset setting 538. Not that other types of data can be included. FIG. 16 illustrates an example of the replacement pattern defining data 530 corresponding to the example illustrated in FIG. 7. FIG. 17 illustrates an example of the replacement pattern defining data 530 corresponding to the examples illustrated in FIGS. 10 and 11.

The applying condition 531 according to the present embodiment includes a character type condition 532 and a section condition 534. Note that other types of condition can be included as appropriate.

The character type condition 532 is a condition related to the type of the character 6.

The section condition 534 is a condition related to the section of the character 6 corresponding to the symbol stop position at which the chance symbol 8*c* has stopped. In other words, the condition is related to positional coordinates of the special position at which the chance symbol 8*c* has stopped.

The replacement target relative position defining data 536 defines relative positional relationship among a reference position, which is the stopped position of the chance symbol 8*c*, and symbols, to be replacement targets, other than the chance symbol 8*c*. Thus, the data may be regarded as defining a distribution pattern of the reward symbols 10 in the reel display area 20, after the replacement.

In FIGS. 16 and 17, a rectangular frame in which the chance symbol 8*c* is illustrated represents the symbol stop position where the chance symbol 8*c* has stopped, and rectangular frames including the word "target" represent the symbol stop positions of the other symbols to be the replacement targets in the periphery of the symbol stop position of the chance symbol 8*c*.

How the replacement target relative position defining data 536 is defined is not limited to that illustrated in FIGS. 16 and 17, and other modes may be employed. Furthermore, the detail of the definition of the replacement target relative position defining data 536 can be set as appropriate. For example, a "direction" may be set in the replacement target relative position defining data 536. Thus, defining data defining the "target" to be at symbol stop positions in the direction thus set from the reference position, which is the stop position of the chance symbol 8*c*, may be employed.

The replacement target position offset setting 538 defines Whether or not to perform the offset control so that all the replacement targets can be within the reel display area 20, when a range of the replacement target, defined by the replacement target relative position defining data 536, spreads out of the reel display area 20. The replacement target position offset setting 538 in FIG. 16 is set to be "OFF". The replacement target position offset setting 538 illustrated in FIG. 17, corresponding to the examples illustrated in FIGS. 10 and 11, is set to be "ON".

Referring back to FIG. 15, the bonus game stage data 550 includes various types of data for implementing the bonus game stage (see FIG. 13).

The play data 700 according to the present embodiment includes various types of data describing a slot game progress status, and includes remaining credits 702, bet setting data 704, an acquired credit amount 706, reel outcome data 708, an appearing character list 710, a character appearing position list 712, reel display control data 714, character control data 716, and bonus game control data 718. Note that other data can be included as appropriate.

The reel outcome data 708 is a list of types of symbols, for each symbol stop position, displayed in the reel display area 20 when the video reels stop.

The appearing character list 710 stores therein results of selecting the appearing characters 6. Although type information of two characters 6 is stored in the present embodiment, when "not appearing" is determined with the lottery to determine whether or not the character 6 appears, the list includes a predetermined value indicating that the type is not set.

The character appearing position list 712 is a list of identification information on a video reel corresponding to the appearing position of the character 6. In other words, the character appearing position list 712 is a list of coordinates of the special position, in the symbol stop positions 7 (see FIG. 3) in the reel display area.

The reel display control data 714 is a data set describing statuses of the video reels displayed in the reel display area 20, and is a list in which the position and the type of the symbol displayed in the reel display area 20 are associated with each other. The control data sequentially changes while the video reels are spinning, and provides a result matching the reel outcome data 708 when the video reels stop spinning.

The character control data 716 includes various types of control data for displaying the character 6 in the game screen.

The bonus game control data 718 includes various types of control data for playing the bonus game stage.

[Operations]

Next, operations of the video slot machine 1300 according to the present embodiment are described.

FIG. 18 and FIG. 19 are each a flowchart illustrating a flow of a process performed by the video slot machine 1300. First of all, the video slot machine 1300 initializes the bet setting and the like (step S10). Specifically, the number of betting lines is reset to "1", and the acquired credit amount 706 is reset to "0". Then, the video slot machine 1300 causes the touch panel 1306 to display an initial screen of the slot game (step S12). The initial screen is a screen that is what is known as a "player wait mode" and "attract mode".

Next, the video slot machine 1300 receives a credit input (step S20). Specifically, the remaining credits 702 (see FIG. 15) is incremented at a predetermined rate, based on the number of tokens 98 (see FIG. 2) input to the token input device 1340 and the amount of paper money input to the paper money input device 1342. When the medium reading device 1344 reads the electronic payment medium 99, a designated amount of electronic payment is received and the remaining credits 702 (see FIG. 15) is incremented at a predetermined rate, based on the payment amount.

When the remaining credits 702 are not smaller than the playable lower limit (TRUE in step S22), the video slot machine 1300 receives the bet setting (for example, the change in the number of betting lines), and updates the bet setting data 704 (see FIG. 15) (step S24).

When a predetermined credit withdrawal operation is detected (NO in step S30 and YES in step S32), the video slot machine 1300 performs a withdrawal process of paying out the credits in the amount corresponding to the remaining credits 702 (step S34).

When an operation on the spin button 1304, that is, a spin operation is detected (YES in step S30), the video slot machine 1300 consumes the credit for the playing fee based on the current bet setting (step S36), and then performs a lottery to determine the reel outcome and the special position (step S40).

How the reel outcome is determined can be selected as appropriate. For example, five random numbers corresponding to the first video reel 21 to the fifth video reel 25 are generated. Then, ranges, each used for picking out three continuous symbols in the symbol column, are determined, based on the random numbers, to be shifted from each other. The picking out range corresponds to the range of the symbol column to be displayed in the reel display area 20. The result of this process is stored in the reel outcome data 708 (see FIG. 15).

In the present embodiment, the special position is determined by 1) the appearing/absence determining lottery process for determining whether or not to make an enemy character appear, 2) a type selecting lottery process for determining a type of the enemy character that appears, and 3) a special position lottery process for determining the appearing position for each enemy character that appears.

The lottery processes each include generating random numbers and making determination by comparing the generated random numbers with a random number range for each lottery result. The results of the appearing/absence determining lottery process and the type selecting lottery process are stored in the appearing character list 710, and a result of the special position lottery process is stored in the character appearing position list 712 (see FIG. 15).

The special position lottery process according to the present embodiment corresponds to selecting a video reel the background of which to include the appearing character 6. Specifically, the character 6 according to the present embodiment has a height corresponding to the number of symbol stop positions arranged in the reel spinning direction in the reel display area 20, that is, a height equivalent to three symbol stop positions. Thus, random numbers are generated for each character 6 that appears, and the video reel the background of which to include the appearing character 6 is determined based on the random numbers. When the character 6 with a height corresponding to two symbol stop positions 2 or less is appeared, the video reel the background of which to include the appearing character 6 is determined and then whether the head section is arranged at the symbol stop position corresponding to the upper section or at the symbol stop position corresponding to the middle section in the reel display area 20 may be determined with random numbers generated.

The random number may be generated in various ways for the lottery. As a matter of course, a method other than that described above may be employed. For example, each lottery may be allocated with the number of digits (order) and a random number with the digits required for all the lotteries may be generated once.

Next, the video slot machine 1300 starts spinning display of the video reels (circulating scroll displaying of the symbol columns) (step S42). Thus, the reel display control data 714 sequentially changes (see FIG. 15).

When the character 6 is set to appear, that is, when the special position is set (YES in step S44), the character 6 is started to be displayed (step S46). Thus, the special position is started to be identifiably displayed, and the character control data 716 changes as appropriate (see FIG. 15).

When a predetermined period of time elapses after the spinning display of the video reels has started, the video slot machine 1300 sequentially stops the spinning display (circulating scroll displaying) of the video reels (step S48). This operation of stopping the spinning of the video reel is performed to obtain a result matching the reel outcome determined in step 540.

Then, the process transitions to FIG. 19. Next, the video slot machine 1300 executes a loop A (step S60 to step S72) for each chance symbol 8*c* in the reel outcome.

In the loop A, first of all, whether or not the chance symbol 8*c*, which is a process target, has stopped in front of the character 6 (step S62) is determined, in other words, whether or not the symbol stop position where the chance symbol 8*c* has stopped is set to be the special position is determined.

When the result is NO (NO in step S62), the video slot machine 1300 replaces the chance symbol 8*c* that is the process target with one reward symbol 10 to be displayed (step S64; see FIG. 6).

When the result is YES (YES in step S62), the video slot machine 1300 implements action display effect including gunshot to the character displayed behind the chance symbol 8*c* that is the process target and display effect of the character 6 being destroyed and disappearing (step S66). Thus, the identifiable displaying of the special position using the character 6 is cancelled.

Next, the video slot machine 1300 selects the replacement pattern to be applied from the replacement pattern defining data 530 (see FIG. 15 to FIG. 17) (step S68). Then, the replacement target is determined in the symbols displayed in the reel display area 20 in the stopped state in accordance with the replacement target relative position defining data 536 (see FIG. 16) corresponding to the replacement pattern thus selected, and the symbols thus determined are replaced with the reward symbol 10 (step S70). Thus, the loop A is completed (step S72).

Before the replacing in step S70, if the replacement target position offset setting 538 (see FIG. 16 and FIG. 17) corresponding to the replacement pattern selected in step S68 is set to be "ON", the replacement target position offsetting is performed (see FIG. 11) so that the replacement target position distribution, defined by the replacement target relative position defining data 536, can be entirely within the reel display area 20.

When the loop A is completed for all the chance symbols 8*c*, the video slot machine 1300 then implements the payout process for the current slot game (step S90). The obtained payout is set to the acquired credit amount 706 and added to the remaining credits 702.

Next, the video slot machine 1300 determines whether or not a bonus game stage start condition is satisfied (step S92). In the present embodiment, the start condition is determined to be satisfied when the reel outcome includes three scatter symbols 8*s*. Note that the start condition can be set as appropriate.

When the start condition is satisfied (YES in step S92), the video slot machine 1300 performs bonus game stage play control (step S94), performs the bonus payout in accordance with the result of the play (step S96), and then prepares for the next spin to start.

The present embodiment described above can provide a video slot machine featuring novel display control before the outcome is determined and a wide variety of payout patterns.

Specifically, the special position is selected from the symbol stop positions 7 in the reel display area 20 for each play (each time the spin operation is performed), and the special position is identifiably displayed using the character 6. When the symbol stop position 7 at which the chance symbol 8*c* has stopped matches the special position, the outcome is determined with the chance symbol 8*c* and other peripheral symbols replaced with the reward symbol 10. In this manner, the novel display control before the outcome is determined can be achieved.

The special position is not fixed, and whether or not the special position is set (that is, whether or not the character 6 appears) is not determined in the first place. Thus, an extremely wide variety of the display control before the outcome is determined can be achieved, whereby the video slot machine 1300 can be more attractive.

The distribution pattern of the replacement target position where the replacing with the reward symbol 10 occurs changes in accordance with various factors. The factors include a combination of the identifiably displayed objects (characters 6) with which the special positions are identifiably displayed, relative positional relationship between arranged positions, and the section of the identifiably displayed object where the chance symbol 8*c* has stopped. Thus, a wide variety of payout patterns can be provided, whereby the video slot machine 1300 can be even more attractive.

The identifiably displayed object for the special position is designed to be a target of an action such as an attacking or capturing in the bonus game stage. Furthermore, the replacement with the reward symbol 10 involves the display effect suggestive of an action game. Thus, the bonus stage can be more consistent with the game world of the slot game than in conventional video slot machines, whereby the video slot machine 1300 can be even more attractive.

Second Embodiment

Next, a second embodiment of the present invention is described. In the present embodiment, the video slot game is implemented as an online game. Components that are the same as the counterparts in the first embodiment are denoted with the same reference numerals, and the description thereof will be omitted. The difference from the first embodiment will be mainly described.

First of all, an example of a hardware configuration according to the present embodiment is described.

FIG. 20 is a diagram illustrating an example of a configuration of a game system according to the present embodiment. A game system 1000 according to the present embodiment is a computer system including a server system 1100 and a user terminal 1500 that can be connected to a communication line 9 to communicate with each other to exchange data. The example illustrated in FIG. 20 includes a single user terminal 1500. However, in an actual operation, a plurality of user terminals 1500 of different users who play the game (hereinafter, referred to as "players") may each be connected to and communicate with the server system 1100. The game system 1000 as a whole may be referred to as a computer system, or the server system 1100 and the user terminal 1500 may each be referred to as an individual computer system.

The communication line 9 is a communication channel that enables data communications. Specifically, the communication line 9 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes a main body device 1101, a keyboard 1106, a touch panel 1108, and a storage 1140. A control board 1150 is provided in the main body device 1101.

The control board 1150 includes microprocessors of various types (e.g., a CPU 1151, a GPU, and a DSP), an IC memory 1152 of various types (e.g., a VRAM, a RAM, and a ROM), and a communication device 1153. The control board 1150 may partially or entirely be implemented with an ASIC, a FPGA, and an SoC.

Through a calculation process performed by the control board 1150 based on a predetermined program and data, the server system 1100 implements 1) a user management function of managing a process related to user registration and the like and user-related information, 2) an online shopping function of selling tokens in the video slot game to the user online, and 3) a game management function of providing data required to play the slot play with the user terminal 1500, to manage play control on the game played with the user terminal 1500. Thus, the video slot game according to the present embodiment is implemented as one type of client-server games.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole.

The server system 1100 is not limited to a configuration managed by a single administrator, and may be a system in which servers managed by different administrators are connected to each other in such a manner as to be able to communicate with each other. For example, the video slot game and the online shopping may be managed by different administrators and implemented by difference servers connected to each other in such a manner as to be able to communicate with each other to function as an integrated server system.

The user terminal 1500 is a computer system, usable by a registered user serving as a player to play the slot play, and is an electronic device (electronic apparatus) that can access the server system 1100 via the communication line 9 to implement the game. The user terminal 1500 according to the present embodiment is a device known as a smartphone. The user terminal 1500 may also be a personal computer, a tablet computer, a wearable computer, or the like.

The user terminal 1500 includes an arrow key 1502, a button switch 1504, the touch panel 1506 that functions as an image display device and a touch position input device, a built-in battery 1509, a speaker 1510, a microphone 1512, a control board 1550, and a memory card reader 1542 that can write and read data to and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or a prepaid card usable for payment involved in playing the slot.

The control board 1550 includes a microprocessor of various types (e.g., the CPU 1551, a GPU, and a DSP), an IC memory 1552 of various types (e.g., a VRAM, a RAM, and a ROM), a wireless communication module 1553 for performing wireless communications with a mobile phone base station, a wireless LAN base station, or the like connected to the communication line 9, an interface circuit 1557, and the like.

The interface circuit 1557 includes circuits such as a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a signal input-output circuit that inputs and outputs a signal to and from the memory card reader 1542, and a signal input-output circuit that inputs and outputs a signal to and from a position measurement module 1555.

The elements mounted on the control board 1550 are electrically connected with each other via a bus circuit or the like to be capable of exchanging data and signals. The control board 1550 may partially or entirely be implemented with an ASIC, an FPGA, or a SoC. The control board 1550 stores a client program and various types of data, for implementing a function as a user terminal of the video slot game according to the present embodiment, in the IC memory 1552.

The client program and various types of setting data are downloaded by the user terminal 1500 from the server system 1100 in the present embodiment. The program and the data may also be read from a storage medium such as the memory card 1540 additionally provided.

FIG. 21 is a block diagram illustrating an example of the configuration of the server system 1100 according to the present embodiment. The server system 1100 according to the present embodiment includes an operation input section **100*s*, a server processing section 200*s*, a sound output section 390*s*, an image display section 392*s*, a communication section 394*s*, and a server storage section 500*s***.

The operation input section **100*s* is for inputting various operations for management. The keyboard 1106 in FIG. 20** corresponds to this section.

The server processing section **200*s* is implemented with electronic parts such as a microprocessor (e.g., a CPU and a GPU), an ASIC, and an IC memory. The server processing section 200*s* controls data exchanged between functional sections including the operation input section 100*s* and the server storage section 500*s*, and performs a calculation process based on a predetermined program, data, the operation input signal from the operation input section 100*s*, data revived from the user terminal 1500, and the like to entirely control the operation of the server system 1100**.

The server processing section **200*s* according to the present embodiment includes a user management section 202, an online shopping management section 210, a game management section a timer section 280*s*, a sound generation section 290*s*, an image generation section 292*s*, and a communication control section 294*s***. Note that other functional sections other than these may be included as appropriate.

The user management section 202 performs a process related to a user registration procedure and manages the data of each user associated with the account (user ID). In the present embodiment, the section has various functions including: 1) issuing an account to a registered user; 2) registration information management for registering and managing personal information for each account; 3) book keeping management for a payment medium consumed for paying for a charged element related to the video slot game (in the present embodiment, purchase of a token, playing fee for the slot game); and 4) play history management for managing login/logout history. Note that any other appropriate management function for other data associated with the account can be included.

The online shopping management section 210 is in charge of control related to the online shopping that is one of the charged elements, and can be implemented with a known online shopping technique. In the present embodiment, the player can purchase tokens of a video slot through online shopping. Any other elements may be set as appropriate to be sold in the online shopping.

The timer section 280*s* uses a system clock to obtain the current date and time, a time limit, and the like.

The sound generation section 290*s* is implemented with an integrated circuit (IC) or by executing software that generates sound data and performs decoding, and generates or decodes sound data on a sound related to system management for the server system 1100 or related to the slot play, background music (BGM), and a character voice. The resultant sound signal related to the system management is output to the sound output section 390*s*.

The sound output section 390*s* receives the sound signal to emit the corresponding sound, and corresponds to a speaker (not illustrated) of the main body device 1101 or the touch panel 1108 in the example illustrated in FIG. 20.

The image generation section 292*s* can generate an image related to the system management for the server system 1100, a game image (or data for displaying the game image on the user terminal 1500), and the like. The image related to the system management can be output to the image display section 392*s*.

The image display section 392*s* displays various images for system management based on the image signals input from the image generation section 292*s*. The image display section 392*s* may be implemented with an image display device such as a flat panel display, a CRT, a projector, or a head-mounted display. The image display section 392*s* corresponds to the touch panel 1108 in the example illustrated in FIG. 20.

The communication control section 294*s* performs a data process related to the data communication, and exchanges data with an external device through the communication section 394*s*. In the present embodiment, a process related to the data communications with the user terminal 1500 is performed.

The communication section 394*s* connects to the communication line 9 to implement communications. The communication section 394*s* is implemented with a transceiver, a modem, a TA, a jack for a communication cable, a control circuit, and the like. In the example illustrated in FIG. 20, the communication device 1153 corresponds to the communication section 394*s*.

The server storage section 500*s* stores a program and various types of data for implementing various functions of the server processing section 200*s* for entirely controlling the server system 1100. The server storage section 500*s* is used as a work area for the server processing section 200*s*, and temporarily stores the results of calculations performed by the server processing section 200*s* based on various programs. The function of the server storage section 500*s* is implemented with an IC memory (e.g., RAM and ROM), a magnetic disk (e.g., hard disk), an optical disk (e.g., CD-ROM and DVD), an online storage, or the like corresponding to a storage medium such as the IC memory 1152 and hard disk mounted in the main body device 1101 and the storage 1140, in the example illustrated in FIG. 20.

FIG. 22 is a diagram illustrating an example of a program and data stored in the server storage section 500*s* according to the present embodiment. The server storage section 500*s* stores therein in advance, a server program 503, a distributed game client program 505, online product defining data 509, and game initial setting data 510.

The server storage section 500*s* stores data, sequentially generated and managed, including user management data 600, the play data 700, and the current date and time 800. Furthermore, the server storage section 500*s* may store information on a timer, a counter, various flags, and the like as appropriate.

The server program 503 is read out and executed by the server processing section 200*s* for implementing functions of the user management section 202, the online shopping management section 210, and the game management section 230 (see FIG. 21).

The distributed game client program 505 is an original of a game client program provided to the user terminal 1500.

The online product defining data 509 is data defining a product purchasable through the online shopping implemented with the online shopping management section 210 (see FIG. 21).

The game initial setting data 510 includes various types of initial setting data, defining data, and the like for executing the video slot game according to the present embodiment.

The user management data 600 is prepared for each registered user, that is, for each player, and includes various types of data associated with the user account. In other words, the data is first play information on a player related to the video slot game. For example, as illustrated in FIG. 23, one user management data 600 includes a unique user account 601, payment medium accounting data 602, play history data 603, and remaining possessed token 604. Note that other data can be included as appropriate.

The payment medium accounting data 602 serves as what is known as an account book storing therein information on a charged/consumed amount of the payment medium associated with the user, information on a reason for the charging/consumption, and information on changed date and time in association with each other. This data can also be referred to as charge history data or charge information.

The play history data 603 is data in which the past game played timings are stored in series, and is automatically updated at a login/logout timing.

The play data 700 according to the present embodiment basically includes the same configuration as that in the first embodiment, and additionally includes a player account 701 that indicates the player to which the play data is related as illustrated in FIG. 24.

FIG. 25 is a block diagram illustrating an example of a configuration of the user terminal 1500 according to the present embodiment. The user terminal 1500 according to the present embodiment includes an operation input section 1001, a terminal processing section 200*t*, a sound output section 390*t*, an image display section 392*t*, a communication section 394*t*, and a terminal storage section 500*t*.

The operation input section 100*t* outputs an operation input signal, based on various operations input by the player, to the terminal processing section 200*t*, and can be implemented with a push switch, a joystick, a touch pad, a track ball, an accelerometer, a gyro, a CCD module, or the like. The operation input section 100*t* corresponds to the arrow key 1502, the button switch 1504, and the touch panel 1506 in FIG. 20.

The terminal processing section 200*t* is implemented with electronic parts such as a microprocessor (e.g., CPU and GPU), an ASIC, and an IC memory. The terminal processing section 200*t* performs input/output control to exchange data with each of the functional sections including the operation input section 100*t* and the terminal storage section 500*t*. The terminal processing section 200*t* executes various calculation processes based on a predetermined program or data, the operation input signal from the operation input section 100*t*, and various types of data received from the server system 1100 to control the operation of the user terminal 1500. The terminal processing section 200*t* corresponds to the control board 1550 in FIG. 20. The terminal processing section 200*t* according to the present embodiment includes a user terminal calculation section 270, a timer section 280*t*, a sound generation section 290*t*, an image generation section 292*t*, and a communication control section 294*t*.

The user terminal calculation section 270 includes an operation signal transmission control section 271, a game screen display control section 272, and a sound play control section 273.

The operation signal transmission control section 271 performs a process of transmitting various types of data and a request to the server system 1100 in accordance with an operation on the operation input section 100*t*.

The game screen display control section 272 performs control for displaying a game screen of the video slot game based on various types of data received from the server system 1100. In this configuration, the server system 1100 generates the image of the game screen. Alternatively, a configuration where the user terminal 1500 generates the image may also be employed.

The sound play control section 273 performs control to emit a sound (for example, sound effects, a BGM, and the like) based on various types of sound data received from the server system 1100.

For example, the sound generation section 290*t* is implemented with a processor such as a DSP or a sound synthesizing IC, an audio codec for playing a sound file, or the like, and generates a sound signal for sound effects, a BGM, various types of operation sounds, and the like related to the video slot game, and outputs the signal thus generated to the sound output section 390*t*.

The sound output section 390*t* is implemented with a device that outputs sound such as sound effects, a BGM, or the like, based on the sound signal received from the sound generation section 290*t*. The sound output section 390*t* corresponds to the speaker 1510 in FIG. 20.

For example, the image generation section 292*t* is implemented with a processor (e.g., a GPU or a DSP), a video signal IC, a program (e.g., video codec), a drawing frame IC memory (e.g., frame buffer), and the like.

The image generation section 292*t* generates an image of one game screen every frame (e.g., 1/60th of a second) based on the various types of data received from the server system 1100, and outputs the generated image signal of the game screen to the image display section 392*t*.

The image display section 392*t* displays various game images based on the image signals input from the image generation section 292*t*. The image display section 392*t* may be implemented with an image display device such as a flat panel display, a CRT, a projector, or a head-mounted display. In the present embodiment, the touch panel 1506 illustrated in FIG. 20 corresponds to the image display section 392*t*.

The communication control section 294*t* performs a data process related to the data communication, and exchanges data with an external device through the communication section 394*t*. The communication section 394*t* connects to the communication line 9 to implement communications. For example, the communication section 394*t* is implemented with a transceiver, a modem, a TA, a jack for a communication cable, a control circuit, and the like, and corresponds to the wireless communication module 1553 in FIG. 20.

The terminal storage section 500*t* stores therein a system program for implementing various functions for causing the terminal processing section 200*t* to entirely control the user terminal 1500, a program and various types of data required for the video slot game, and the like. The terminal storage section 500*t* is used as a work area for the terminal processing section 200*t*, and temporarily stores a result of calculation performed by the terminal processing section 200*t* in accordance with various programs, input data received from the operation input section 100*t*, and the like. These functions are implemented with an IC memory (e.g., RAM and ROM), a magnetic disk (e.g., hard disk), an optical disk (e.g., CD-ROM and DVD), or the like. The IC memory 1552 and the memory card 1540 in the control board 1550 illustrated in FIG. 20 correspond to the terminal storage section 500*t*. The terminal storage section 500*t* may be implemented with an online storage.

The terminal storage section 500*t* according to the present embodiment stores therein a game client program 504. Note that other data, including data in which user position information is stored in time series, can be included as appropriate.

The game client program 504 is application software that implements a function of the user terminal calculation section 270 when read and executed by the terminal processing section 200*t*, and may be embedded as a part of the terminal system program. In the present embodiment, the game client program 504 is a copy of the distributed game client program 505 (see FIG. 22) provided from the server system 1100.

The game client program 504 may be implemented with a dedicated client program or with a web browser program and a plugin that implements an interactive image display, depending on a technique and a method for implementing the video slot game.

The operation of the game system 1000 may be regarded as being executed by the server system 1100 through the flowcharts in FIGS. 18 and 19. The credit input reception may be regarded as reception of input of a token possessed by the player or a confirmation operation for payment using a payment medium.

The present embodiment can provide the same advantageous effect as the first embodiment through the online game.

Third Embodiment

Next, a third embodiment of the present invention is described.

The present embodiment is implemented to be basically the same as the second embodiment, but is different from the second embodiment in that the user terminal 1500 controls the progress of the video slot game. The following mainly describes differences from the second embodiments. Components that are the same as the counterparts in the first and second embodiments are denoted with the same reference numerals, and the description thereof will be omitted.

FIG. 26 is a block diagram illustrating an example of a configuration of a user terminal 1500B according to the present embodiment. The user terminal 1500B according to the present embodiment is a terminal in which the game screen display control section 272 and the sound play control section 273 are omitted and the game management section 230 included in the server system 1100 according to the first embodiment is provided instead. Specifically, the user terminal 1500B according to the present embodiment independently performs a calculation process related to the game progress and generates images of the game space.

FIG. 27 is a diagram illustrating an example of a program and data stored in the terminal storage section 500 of the user terminal 1500B according to the present embodiment. The terminal storage section 500 according to the present embodiment stores therein a game program 508. The game program 508 is a program that causes the terminal processing section 200 to implement the user terminal calculation section 270 and the game management section 230 according to the present embodiment. In the present embodiment, as the game management section 230 is implemented with the user terminal 1500B, data from the game initial setting data 510 to the current date and time 800 not including the user management data 600 is stored in the terminal storage section 500*t*.

A flow of the process according to the present embodiment is basically the same as the flow of the process performed by the server system 1100 according to the second embodiment, that is, the flowcharts in FIG. 18 and FIG. 19 according to the first embodiment. The user terminal 1500B implements the game management section 230, and thus the subject of each step may be changed to the server system 1100 or the user terminal 1500B as appropriate. When the user terminal 1500B performs a process requiring the user management data 600 to be referred to, such as login, the server system 1100 is requested to provide required data or perform matching, or may be requested to perform the entire process.

The present embodiment can provide the same advantageous effect as the first and second embodiments.

The user terminal 1500B may be partially in charge of the functions of the game management section 230 in a limited manner, instead of being entirely in charge of the functions.

MODIFICATIONS

The embodiments to which the invention is applied have been described above. Note that the invention is not limited thereto. Various modifications may be made as appropriate, such as adding other elements, omitting some of the elements, or changing some of the elements.

First Modification

For example, the theme and the game world of the video slot machine can be set differently as appropriate, and the design of the chance symbol and the identifiably displayed object for the special position can be changed accordingly.

For example, FIG. 28 illustrates an example of a game screen W14 the theme of which is designed to be fishing. Here, the chance symbol 8*c* is designed to be a float floating on water. Other symbols 8 are designed to be images indicating the water surface or waves. Characters 6*f* to be the special position identifiably displaying objects are designed to be images of fish or water creatures. A preferable content of the bonus game stage is a game of fishing or capturing fantastic large fish or fantastic water creatures.

Other possible themes of the video slot game include attacking to a submarine, a ship, or a battle craft, hunting, capturing live stocks running away, saving victims, insect collecting, arresting criminals, and the like.

Second Modification

In the embodiment described above, the identifiable displaying of the special position is unchanged between the start of the displaying and the end of the reel spinning. Thus, the character 6 does not shift from the background of the video reel that is the appearing position to other video reels. Alternatively, the displayed position of the character 6 may be changed before the reels stop spinning.

This is described in detail based on the example illustrated in FIG. 28. As illustrated in flowcharts in FIG. 29 and FIG. 30, step S47 is executed instead of step S46 in the first embodiment. In step S47, display effect for making the character 6*f* (fish) serving as the special position identifiably displaying object appear in the game screen W14 and swim around in the screen. Then, the character 6*f* (fish) may stop at the special position before the video reels stop spinning (step S58).

With this configuration, the character 6*f* (fish) serving as the special position identifiably displaying object keeps moving until the video reels stop spinning. Thus, the special position keeps changing to fuel the excitement.

Third Modification

In the embodiment described above, the "replacing" for displaying the reward symbol is described as a physical process of substituting a symbol. Alternatively, the "replacing" may be implemented by simply displaying the reward symbol in front of a symbol in an overlapping manner. This can similarly achieve the "replacing" with the same effects.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A video slot machine comprising:

a reel display area; and at least one processor or circuit configured to:

display symbol columns of N reels (N≥3) that are scrolling in the reel display area, the symbol columns including two or more symbol stop positions for each of the reels;

performing a lottery to determine a special position for a unique character in the symbol stop positions;

identifiably displaying the unique character at the special position underneath at least one symbol column in the reel display area, before stopping scrolling of the symbol columns in the reel display area; and performing a reward process when a symbol stopped at the special position, when the scroll displaying of the symbol columns stops, the symbol being a predetermined chance symbol.

2. The video slot machine according to claim 1, wherein the reward process at least includes a process of replacing the chance symbol stopped at the special position with a predetermined reward symbol.

3. The video slot machine according to as defined in claim 1, wherein the reward process at least includes a first replacement process of replacing a symbol in a reel including the chance symbol stopped at the special position with a predetermined reward symbol.

4. The video slot machine according to claim 1, wherein the reward process at least includes a second replacement process of replacing a symbol in a reel including the chance symbol stopped at the special position as well as a symbol in an adjacent reel with a predetermined reward symbol.

5. The video slot machine according to claim 4, wherein the second replacement process includes replacing symbols in X continuous reels ($N>X\geq 2$) including the reel having the chance symbol stopped at the special position with the reward symbol.

6. The video slot machine according to claim 4, wherein performing the lottery includes selecting a plurality of the special positions, and the reward process includes changing payout when the second replacement process results in overlapping reels including replacement targets.

7. The video slot machine according to claim 2, wherein the reward symbol is a wild symbol or a scatter symbol.

8. The video slot machine according to claim 1, wherein performing the lottery includes selecting a position in the reel display area where the character is displayed with a predetermined size at the special position, and the display of the special position includes displaying the character at the special position.

9. The video slot machine according to claim 8, wherein the size of the character includes at least two of the symbol stop positions adjacent to each other.

10. The video slot machine according to claim 9, wherein performing the reward process includes:

performing a first reward process when a stop position of the chance symbol overlaps with a first section of the character, and performing a second reward process when the stop position overlaps with a second section of the character.

11. The video slot machine according to claim 8, wherein the character includes at least a first character and a second character, performing the lottery includes selecting a first special position where the first character is displayed and selecting a second special position where the second character is displayed, displaying the special position includes displaying the first character at the first special position and displaying the second character at the second special position, and performing the reward process includes performing a first reward process when a stop position of the chance symbol overlaps with the first character, and performing a second reward process when the stop position overlaps with the second character.

12. The video slot machine according to claim 10, wherein the first reward process includes replacing a first number of symbols, including the chance symbol stopped at the special position, with the predetermined reward symbol, and the second reward process includes replacing a second number of symbols, including the chance symbol stopped at the special position, with the reward symbol, the second number of symbols being larger than the first number of symbols.

13. The video slot machine according to claim 11, wherein the first reward process includes at least a process of replacing a first number of symbols, including the chance symbol stopped at the special position, with the predetermined reward symbol, and the second reward process includes at least replacing a second number of symbols, including the chance symbol stopped at the special position, with the reward symbol, the second number of symbols being larger than the first number of symbols.

14. The video slot machine according to claim 8, wherein the video slot machine has a bonus game stage in which attacking, capturing, or acquiring is performed on a target object or a target character, and the character is the target object or the target character appearing in the bonus game stage.

15. The video slot machine according to claim 10, wherein the video slot machine has a bonus game stage in which attacking, capturing, or acquiring is performed on a target object or a target character, and the character is the target object or the target character appearing in the bonus game stage.

16. The video slot machine according to claim 11, wherein the video slot machine includes a bonus game stage in which attacking, capturing, or acquiring is performed on a target object or a target character, and the character is the target object or the target character appearing in the bonus game stage.

17. A server system comprising:

at least one processor or circuit configured to:

display, in a reel display area, symbol columns of N reels ($N\geq 3$) that are scrolling in the reel display area, the symbol columns including two or more symbol stop positions for each of the reels to control progress of a video slot game in a user terminal;

performing a lottery to determine a special position for a character in the symbol stop positions;

identifiably displaying the character at the special position underneath at least one symbol column in the reel display area, before stopping scrolling of the symbol columns in the reel display area; and performing a reward process when a symbol stopped at the special position, when the scroll displaying of the symbol columns stops, the symbol being a predetermined chance symbol.

18. A computer system comprising:

a user terminal receiving a user operation; and a server system having at least one processor or circuit configured to:

display, in a reel display area, symbol columns of N reels ($N\geq 3$) that are scrolling in the reel display area, the symbol columns including two or more symbol stop positions for each of the reels to control progress of a video slot game in the user terminal;

performing a lottery to determine a special position for a character in the symbol stop positions;

identifiably displaying the character at the special position underneath at least one symbol column in the reel display area, before stopping scrolling of the symbol columns in the reel display area; and performing a reward process when a symbol stopped at the special position, when the scroll displaying of the symbol columns stops, the symbol being a predetermined chance symbol.

19. A video slot machine comprising:

a reel display area;

at least one processor or circuit programmed to:

display symbol columns of N reels ($N\geq 3$) that are scrolling in the reel display area, the symbol columns including two or more symbol stop positions for each of the reels;

performing a lottery to determine a special position in the symbol stop positions;

identifiably displaying the special position in the reel display area, before stopping scrolling of the symbol columns in the reel display area; and performing a reward process when a symbol stopped at the special position, when the scroll displaying of the symbol columns stops, the symbol being a predetermined chance symbol, the reward process including: (i) a second replacement process of replacing a symbol in a reel including the chance symbol stopped at the special position as well as a symbol in an adjacent reel with a predetermined reward symbol, and (ii) changing payout when the second replacement process results in overlapping reels including replacement targets.

20. A video slot machine comprising:

a reel display area;

at least one processor or circuit programmed to:

display symbol columns of N reels (N≥3) that are scrolling in the reel display area, the symbol columns including two or more symbol stop positions for each of the reels;

performing a lottery to determine a special position in the symbol stop positions including: (a) selecting a position in the reel display area where the character is displayed with a predetermined size at the special position, (b) selecting a first special position where the first character is displayed, and (c) selecting a second special position where the second character is displayed;

identifiably displaying the special position in the reel display area, including displaying the first character at the first special position and displaying the second character at the second special position, before stopping scrolling of the symbol columns in the reel display area; and performing a reward process when a symbol stopped at the special position, when the scroll displaying of the symbol columns stops, the symbol being a predetermined chance symbol, the reward process including: (i) performing a first reward process when a stop position of the chance symbol overlaps with the first character, and (ii) performing a second reward process when the stop position overlaps with the second character.

21. A video slot machine comprising:

a reel display area;

at least one processor or circuit programmed to:

display symbol columns of N reels (N≥3) that are scrolling in the reel display area, the symbol columns including two or more symbol stop positions for each of the reels;

performing a lottery to determine a special position in the symbol stop positions;

identifiably displaying the special position in the reel display area, before stopping scrolling of the symbol columns in the reel display area; and performing a reward process when a symbol stopped at the special position, when the scroll displaying of the symbol columns stops, the symbol being a predetermined chance symbol, the reward process including: (i) performing a first reward process when a stop position of the chance symbol overlaps with a first section of the character, and (ii) performing a second reward process when the stop position overlaps with a second section of the character, wherein:

the first reward process includes replacing a first number of symbols, including the chance symbol stopped at the special position, with the predetermined reward symbol, and the second reward process includes replacing a second number of symbols, including the chance symbol stopped at the special position, with the reward symbol, the second number of symbols being larger than the first number of symbols.

* * * * *